(12) United States Patent
Endo

(10) Patent No.: US 11,488,192 B2
(45) Date of Patent: Nov. 1, 2022

(54) REWARD PROVISION DEVICE, REWARD PROVISION METHOD, AND PROGRAM

(71) Applicant: GREE, Inc., Tokyo (JP)

(72) Inventor: Tatsuya Endo, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/062,298

(22) Filed: Oct. 2, 2020

(65) Prior Publication Data

US 2021/0110424 A1    Apr. 15, 2021

(30) Foreign Application Priority Data

Oct. 9, 2019   (JP) .............................. JP2019-186004

(51) Int. Cl.
*G06Q 30/02*   (2012.01)

(52) U.S. Cl.
CPC ..... *G06Q 30/0233* (2013.01); *G06Q 30/0224* (2013.01); *G06Q 30/0232* (2013.01); *G06Q 30/0236* (2013.01)

(58) Field of Classification Search
CPC ........... G06Q 30/0229; G06Q 30/0601; G06Q 20/20; G06Q 30/0224; G06Q 30/0635
See application file for complete search history.

(56) References Cited

U.S. PATENT DOCUMENTS

2001/0034663 A1* 10/2001 Teveler .............. G06Q 30/0635
                                                          705/14.1
2011/0010238 A1*  1/2011 Postrel ............... G06Q 30/0207
                                                          705/14.1

(Continued)

FOREIGN PATENT DOCUMENTS

JP    2001-118011 A    4/2001
JP    2005-352583 A    12/2005

(Continued)

OTHER PUBLICATIONS

JPO Office Action in Japanese application No. 2019-186004, dated Jul. 14, 2020. (6 pages).

(Continued)

*Primary Examiner* — Saba Dagnew
(74) *Attorney, Agent, or Firm* — Finnegan, Henderson, Farabow, Garrett & Dunner LLP

(57) ABSTRACT

A point applying unit associates a predetermined point according to a type of regular purchase contract with user identification information according to a contractual user, for each predetermined period; a number-of-points information storage unit stores number-of-points information representing the number of points for each reward, in a plurality of providable rewards; a selection information acquisition unit retrieves selection information that is associated with the user identification information and represents a selected reward of the plurality of rewards; and a reward management unit enables the selected reward to be used, based on the user identification information, in a case where the total number of points are set by the selection information retrieved by the selection information acquisition unit and the number-of-points information in the number-of-points information storage unit and are associated with the selected reward has a predetermined relationship with the predetermined point associated by the point applying unit.

17 Claims, 19 Drawing Sheets

(56) References Cited

U.S. PATENT DOCUMENTS

| | | | | |
|---|---|---|---|---|
| 2011/0131108 A1* | 6/2011 | Doxey | ................... | G06Q 30/02 |
| | | | | 705/26.1 |
| 2013/0080271 A1* | 3/2013 | Ronca | ................... | G06Q 20/20 |
| | | | | 705/16 |
| 2014/0156406 A1* | 6/2014 | Kim | ................... | G06Q 30/0224 |
| | | | | 705/14.56 |
| 2015/0379549 A1* | 12/2015 | Hwang | ................... | G09C 1/00 |
| | | | | 705/14.27 |

FOREIGN PATENT DOCUMENTS

| | | |
|---|---|---|
| JP | 2016-126599 A | 7/2016 |
| JP | 2017-073164 A | 4/2017 |

OTHER PUBLICATIONS

JPO Office Action in corresponding Japanese application No. 2019-186004, dated Feb. 25, 2020.

\* cited by examiner

| USER ID | USER NAME | PASSWORD | PHONE NUMBER | POSSESSED COIN | INFORMATION RELEVANT TO GAME | INFORMATION RELEVANT TO SNS | PREFERENCE INFORMATION | ... |
|---|---|---|---|---|---|---|---|---|
| U01 | User 01 | *** | *** | *** | *** | *** | *** | ... |
| U02 | User 02 | *** | *** | *** | *** | *** | *** | ... |
| U03 | User 03 | — | *** | *** | *** | *** | *** | ... |
| ... | ... | ... | ... | ... | ... | ... | ... | ... |

*FIG. 4*

| USER ID | RANK | INFORMATION RELEVANT TO POSSESSED GAME CONTENT | INFORMATION RELEVANT TO USED GAME CONTENT | FRIEND INFORMATION |
|---|---|---|---|---|
| U01 | *** | *** | *** | *** |
| U02 | *** | *** | *** | *** |
| ... | ... | ... | ... | ... |

| TYPE OF CONTRACT | POINT PARAMETER K1 | MONTHLY AMOUNT |
|---|---|---|
| REGULAR PURCHASE CONTRACT A1 | 5 | 500 YEN |
| REGULAR PURCHASE CONTRACT A2 | 10 | 1000 YEN |

FIG. 7

| REWARD | NUMBER OF POINTS |
|---|---|
| REWARD B1 | *** |
| REWARD B2 | *** |
| ... | ... |

FIG. 8

| USER ID | REWARD BEING SELECTED |
|---|---|
| U01 | REWARDS B1, C1, D1 |
| U03 | REWARDS B2, C1, D95, E60 |
| ... | ... |

| DIGITAL CONTENT | REWARD TO BE SET | SERVER COMPUTER |
|---|---|---|
| GAME APPLICATION GA | REWARDS A0~A50 | SERVER COMPUTER SA |
| GAME APPLICATION GB | REWARDS B0~B40 | SERVER COMPUTER SB |
| DIGITAL BOOKS DD0~DD5 | REWARDS C0~C5 | SERVER COMPUTER SC |
| ... | ... | ... |

*FIG. 15*

| DIGITAL CONTENT | REWARD TO BE SET | SERVER COMPUTER |
|---|---|---|
| GAME APPLICATION GA | REWARDS A0~A50 | SERVER COMPUTER SA |

*FIG. 17*

REWARD PROVISION DEVICE, REWARD PROVISION METHOD, AND PROGRAM

CROSS REFERENCE TO RELATED APPLICATIONS

This application claims priority to Japanese Patent Application No. 2019-186004 filed Oct. 9, 2019, the contents of which is incorporated herein by reference in its entirety.

BACKGROUND

Technical Field

The present disclosure relates to a device, a method, and a program for providing a reward (e.g., a benefit) to a user.

Related Art

From the related art, a technology for automatizing billing for each predetermined period with respect to a product or the like that is periodically purchased by a customer has been known (see, e.g., Japanese Patent Document JP 2016-126599 A).

However, in the related art, it is difficult to diversify a combination of rewards that are available in a regular purchase contract, without excessively diversifying the type of contract. A regular purchase contract may include a subscription. For example, in a case of providing many different types of contracts to account for the number of possible combinations of various rewards, the type of contract is excessively diversified, and a processing load according to the contract increases.

SUMMARY

Therefore, an object of some embodiments of the present disclosure is to diversify a combination of rewards that are available in a regular purchase contract, without excessively diversifying the type of contract.

In one aspect, a device includes:
a point applying unit that associates a predetermined point according to a type of regular purchase contract with user identification information according to a user who has performed (e.g., satisfied the user's obligations of) the regular purchase contract, for each predetermined period according to the regular purchase contract;
a number-of-points information storage unit that stores number-of-points information representing the number of points associated with use of a reward, for each reward, in a plurality of providable rewards;
a selection information acquisition unit that retrieves selection information that is associated with the user identification information and represents one or more selected rewards of the plurality of rewards;
a determination unit that determines whether or not the total number of points that are set by the selection information retrieved by the selection information acquisition unit and the number-of-points information in the number-of-points information storage unit and are associated with the one or more selected rewards has a predetermined relationship with the predetermined point associated by the point applying unit; and
a reward management unit that enables the one or more selected rewards to be used, based on the user identification information, in a case where it is determined that there is the predetermined relationship by the determination unit.

In one aspect, according to the present disclosure, it is possible to diversify a combination of rewards that are available in a regular purchase contract, without excessively diversifying the type of regular purchase contract.

BRIEF DESCRIPTION OF DRAWINGS

FIG. 4 is an explanatory diagram of data in a user information storage unit;

FIG. 5 is an explanatory diagram of information relevant to a game;

FIG. 6 is an explanatory diagram of a point parameter in a point parameter storage unit;

FIG. 7 is an explanatory diagram of number-of-points information in a number-of-points information storage unit;

FIG. 8 is an explanatory diagram of selection information in a selection information storage unit;

FIG. 15 is an explanatory diagram of a premise of one operation example;

FIG. 17 is an explanatory diagram of a premise of another operation example;

DETAILED DESCRIPTION

Figure 1:
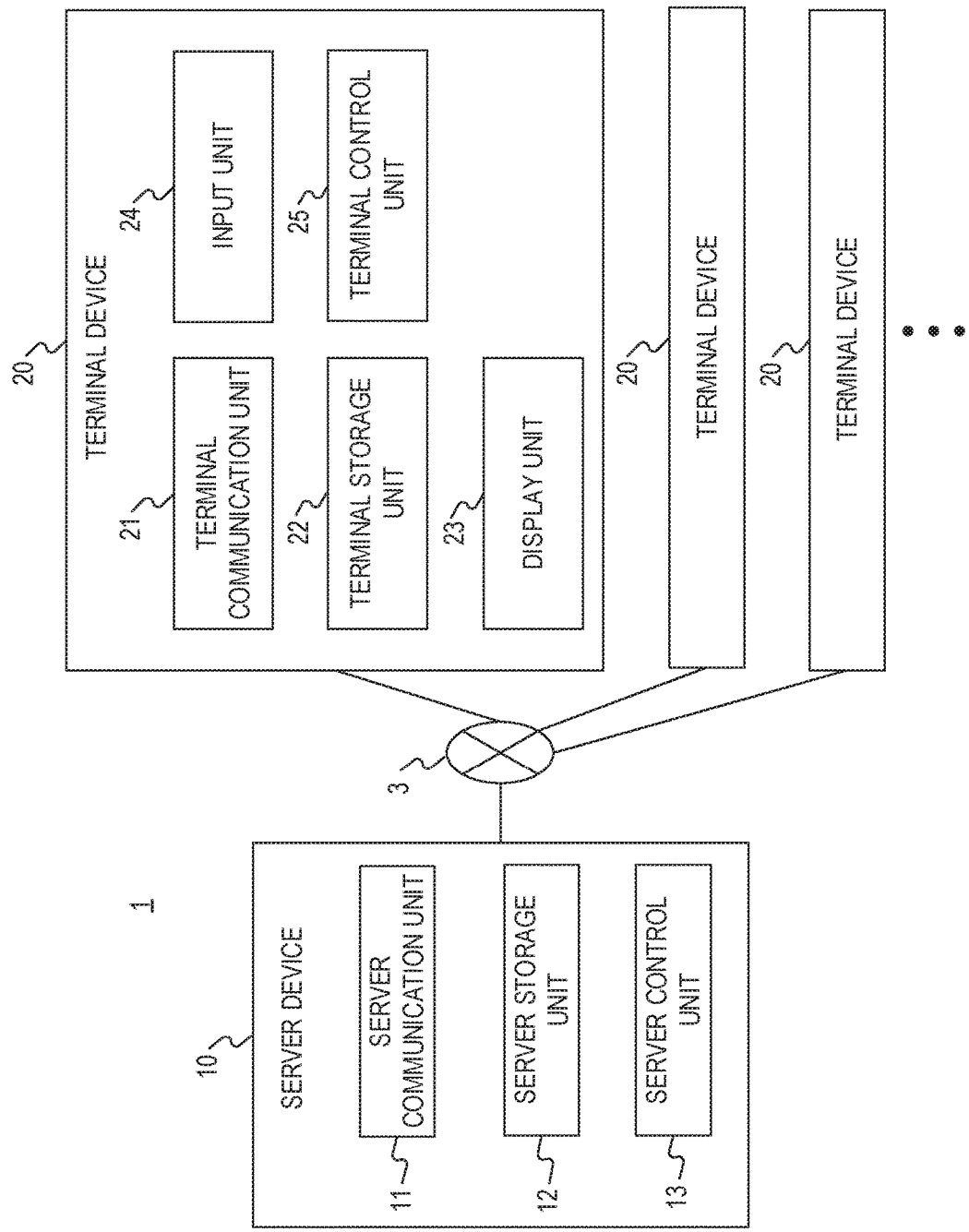
FIG. 1 is a block diagram of a service system according to this embodiment.

Hereinafter, each embodiment will be described in detail, with reference to the accompanying drawings.
(Outline of Service System)
The outline of a service system 1 according to this embodiment will be described with reference to FIG. 1. FIG. 1 is a block diagram of the service system 1 according to this embodiment. The service system 1 includes a server device 10 and one or more terminal devices 20. In FIG. 1, for simplicity, three terminal devices 20 are illustrated, but the number of terminal devices 20 may be greater than or equal to 2.

The server device 10, for example, is an information processing device such as a server that is managed by a service operator. In this embodiment, as an example, the server device 10 attains a so-called service platform, and provides various services through the service platform. Specifically, as an example, the server device 10 provides an application portal site (hereinafter, also simply referred to as a "site"), a service for providing a digital content such as application software (hereinafter, also simply referred to as an "application"), and a social network function (hereinafter, also simply referred to as an "SNS function") to a registered user (and as necessary, a guest user). Hereinafter, the registered user (and as necessary, the guest user) will also be simply referred to as a "user".

The number of sites provided by the server device 10 is arbitrary, and in this embodiment, as an example, one site (hereinafter, also referred to as a "site A") is provided. Note that, in a modification example, the site A may include a plurality of sites including related sites.

The type or the number of digital contents provided by the server device 10 is arbitrary, and in this embodiment, as an example, the digital content provided by the server device 10 may include one or more applications for a game (hereinafter, also simply referred to as "game applications") or an application for providing information, a digital book, and the like. The game application and the like may be executable through the site A, or may be executable not through a predetermined site such as the site A (for example, may be executable offline). That is, various applications as the digital content provided by the server device 10 may be used as a so-called native application by being installed in the terminal device 20. Hereinafter, the game indicates a game according to the game application provided by the server device 10. The application for providing information may be relevant to a specific genre of information provision service (an information provision service relevant to a travel, a habitation, a food product, a fashion, health, beauty care, and the like), a broadcast service by a specific user (for example, Youtube (Registered Trademark)), and the like. In addition, a specific application provided by the server device 10 may be a combination of a plurality of applications (for example, an application of a hierarchical structure).

The type or the number of SNS functions provided by the server device 10 is arbitrary, and here, may be a function such as diary, chatting, a message board/notice board (a community), a comment, a messenger, a friend request, and the transmission of an object (the transmission of a gift). The SNS function may be executable through the site A.

The terminal device 20, for example, is an information processing device that is used by a user, such as a mobile phone, a smart phone, a tablet terminal, a personal computer (PC), or a game device. The terminal device 20 is capable of executing various applications according to this embodiment. Various applications may be received by the terminal device 20 from the server device 10 or the other predetermined application distribution server through a network 3, or may be stored in advance in a storage device provided in the terminal device 20 or a storage medium that can be read by the terminal device 20, such as a memory card. The server device 10 and the terminal device 20 are connected to each other through the network 3 such that communication can be performed. For example, the server device 10 and the terminal device 20 execute various pieces of processing relevant to the service, in cooperation.

Note that, the network 3 may include a radio communication network, the Internet, a virtual private network (VPN), a wide area network (WAN), a wired network, an arbitrary combination thereof, or the like.

(Configuration of Server Device)

The configuration of the server device 10 will be described in detail. The server device 10 includes a server computer. The server device 10 may be attained by the cooperation of a plurality of server computers.

The server device 10 includes a server communication unit 11, a server storage unit 12, and a server control unit 13.

The server communication unit 11 includes an interface that performs communication with an external device over the radio or by wire and performs the transmission and reception of information. The server communication unit 11, for example, may include a radio local area network (LAN) communication module, a wired LAN communication module, or the like. The server communication unit 11 is capable of transmitting and receiving the information with respect to the terminal device 20 through the network 3.

The server storage unit 12, for example, includes a primary storage device and a secondary storage device. For example, the server storage unit 12 may include a semiconductor memory, a magnetic memory, an optical memory, or the like. The server storage unit 12 stores various information items and programs that are used in the processing relevant to the service. At least a part of the information items and the programs stored in the server storage unit 12 may be shared and synchronized with the terminal device 20.

The server control unit 13 includes one or more processors. The processor may include a general-purpose processor that attains a specific function by reading a specific program, and a dedicated processor dedicated to specific processing. The server control unit 13 controls the operation of the entire server device 10. The details of the server control unit 13 will be described below.

(Configuration of Terminal Device)

The configuration of the terminal device 20 will be described in detail. As illustrated in FIG. 1, the terminal device 20 includes a terminal communication unit 21, a terminal storage unit 22, a display unit 23, an input unit 24, and a terminal control unit 25.

The terminal communication unit 21 includes an interface that performs communication with an external device over the radio or by wire and performs the transmission and reception of information. The terminal communication unit 21 may include, for example, a radio communication module corresponding to a mobile communication standard such as long term evolution (LTE) (Registered Trademark), a radio LAN communication module, a wired LAN communication module, or the like. The terminal communication unit 21 is capable of transmitting and receiving the information with respect to the server device 10 through the network 3.

The terminal storage unit 22, for example, includes a primary storage device and a secondary storage device. For example, the terminal storage unit 22 may include a semiconductor memory, a magnetic memory, an optical memory, or the like. The terminal storage unit 22 stores various information items and programs that are used in the processing relevant to the service and are received from the server device 10. The information and the program that are used in the processing relevant to the service may be retrieved from the external device through the terminal communication unit 21. For example, the game application may be retrieved from a predetermined application distribution server.

The display unit 23, for example, includes a display device such as a liquid crystal display or an organic electroluminescence (EL) display. The display unit 23 is capable of displaying various screens.

The input unit 24, for example, includes an input interface including a touch panel integrated with the display unit 23. The input unit 24 is capable of receiving user input with respect to the terminal device 20. In addition, the input unit 24 may include a physical key, or may further include an arbitrary input interface such as a pointing device such as a mouse.

The terminal control unit 25 includes one or more processors. The terminal control unit 25 controls the operation of the entire terminal device 20. Hereinafter, an example of the operation of the terminal control unit 25 will be described in detail.

The terminal control unit 25 performs the transmission and reception of information through the terminal communication unit 21. For example, the terminal control unit 25 receives various information items and programs that are used in the processing relevant to the service, from at least one of the server device 10 and other external servers. The terminal control unit 25 stores the received information and program in the terminal storage unit 22.

The terminal control unit 25 activates the site A, various applications (for example, the native application on the terminal device 20, the game application in the site A, or the like), in accordance with the manipulation of the user. The terminal control unit 25 executes the processing relevant to the service, in cooperation with the server device 10. For example, the terminal control unit 25 displays various screens according to the processing relevant to the service on the display unit 23. For example, a graphic user interface (GUI) for detecting the user manipulation is displayed on the screen. The terminal control unit 25 is capable of detecting the user manipulation with respect to the screen through the input unit 24.

In this embodiment, as an example, the number of games that can be played by each user through the site A is greater than or equal to 1. One of various games, for example, is a game as described below with reference to FIG. 2.

(Outline of Game Application)

The outline of an example of the game application according to this embodiment will be described. The game according to this embodiment includes one or more game parts. At least one game part of one or more game parts may be executed by using game content.

The game content may include various media. The game content may be electronic data that is used in the game, and for example, includes an arbitrary medium such as a card, an item, a point, an in-service currency (or in-game currency), a ticket, a character, an avatar, and a parameter. In addition, the game content may be game related information such as level information, status information, game parameter information (a physical power value, offensive power, or the like), or capability information (a skill, an ability, a spell, a job, and the like). In addition, the game content may be electronic data that can be retrieved, acquired, possessed, used, managed, exchanged, synthesized, enhanced, sold, discarded, donated, or the like in the game by the user, and a use mode of the game content is not limited to that clearly specified in this specification.

Hereinafter, unless otherwise specified, the "game content possessed by the user" indicates a game content associated with a user ID capable of uniquely identifying the user as a possessed game content. In addition, "applying the game content to the user" indicates associating the game content with the user ID as the possessed game content. In addition, "abandoning the game content possessed by the user" indicates dissolving the association between the user ID and the possessed game content. In addition, "consuming the game content possessed by the user" indicates enabling any effect or influence to be exerted in the game, in accordance with the dissolution of the association between the user ID and the possessed game content. In addition, "selling the game content possessed by the user" indicates dissolving the association between the user ID and the possessed game content and associating the other game content (for example, a virtual currency, an item, or the like) with the user ID as the possessed game content. In addition, "assigning a game content possessed by a user A to a user B" indicate dissolving the association between a user ID of the user A and the possessed game content and associating the game content with a user ID of the user B as the possessed game content. In addition, "preparing the game content" indicates defining or determining at least a part of information relevant to the game content.

The game part is a content that can be played by the user in the game, and for example, includes a quest, a mission, a mini game, training, enhancement, and synthesis of the game content, a game content acquisition event, a search event of a virtual space, a competition event with respect to an opponent (for example, another user, an enemy character, a building of an enemy, and the like), or the like. One or more predetermined tasks (game tasks) may be set in each of the game parts. For example, in a case where it is determined that the attainment of one or more game tasks set in the game part that is played by the user is successful, for example, the game content or the like may be applied to the user as a reward. For example, an arbitrary task according to the content of the game part, such as a task for winning a competition with the enemy character, a task for reaching a finish line in the virtual space, and a task for setting the character of the user not to be in a predetermined state (for example, a behavior disabled state) until a predetermined time elapses, can be adopted to the game task. In addition, in one or more game tasks set in the game part, attaining a specific task (a clear task) also indicates clearing the game part. In a case where the user playing the game part succeeds in attaining the clear task, it may be determined that the game part is cleared, and the game part may be ended.

In one or more game parts, a game part for a single play and a game part for a multi-play may be included. The game part for a single play, for example, may include a game part to be executed based on user manipulation with respect to one terminal device 20 that is used by one user (for example, a one-player game part). For example, one terminal device 20 independently executes the game part for a single play, or one terminal device 20 and the server device 10 execute the game part for a single play in cooperation. On the other hand, the game part for a multi-play, for example, may include a game part common to two or more users, which is executed based on user manipulation with respect to two or more terminal devices 20 that are used by two or more users, respectively (for example, a multiplayer game part). The game part common to two or more users, for example, may include a game part in which at least a part of progression processing of the game part and at least a part of a processing result is applied to the two or more users in common. For example, two or more terminal devices 20 execute the game part for a multi-play in cooperation, or two or more terminal devices 20 and the server device 10 execute the game part for a multi-play in cooperation. One game part may correspond to both of a single play and a multi-play.

One of the games according to this embodiment, for example, includes a competition game part including an element of a horizontal scroll type action game, and an element of a competition game for competing with the opponent by using the game content, as an example. The user selects one or more game media that are used in the competition game part, from the game media possessed by the user (the possessed game media). Hereinafter, each of the game media that are used in the competition game part may be referred to as a first game content. The one or more first game media may be collectively referred to as a deck or a team. The opponent, for example, is a game content that is automatically manipulated, such as a non-player character (NPC), but is not limited thereto. For example, the opponent may be a game content that is manipulated by another user. In one competition game part, the number of opponents may be arbitrarily set.

Figure 2:
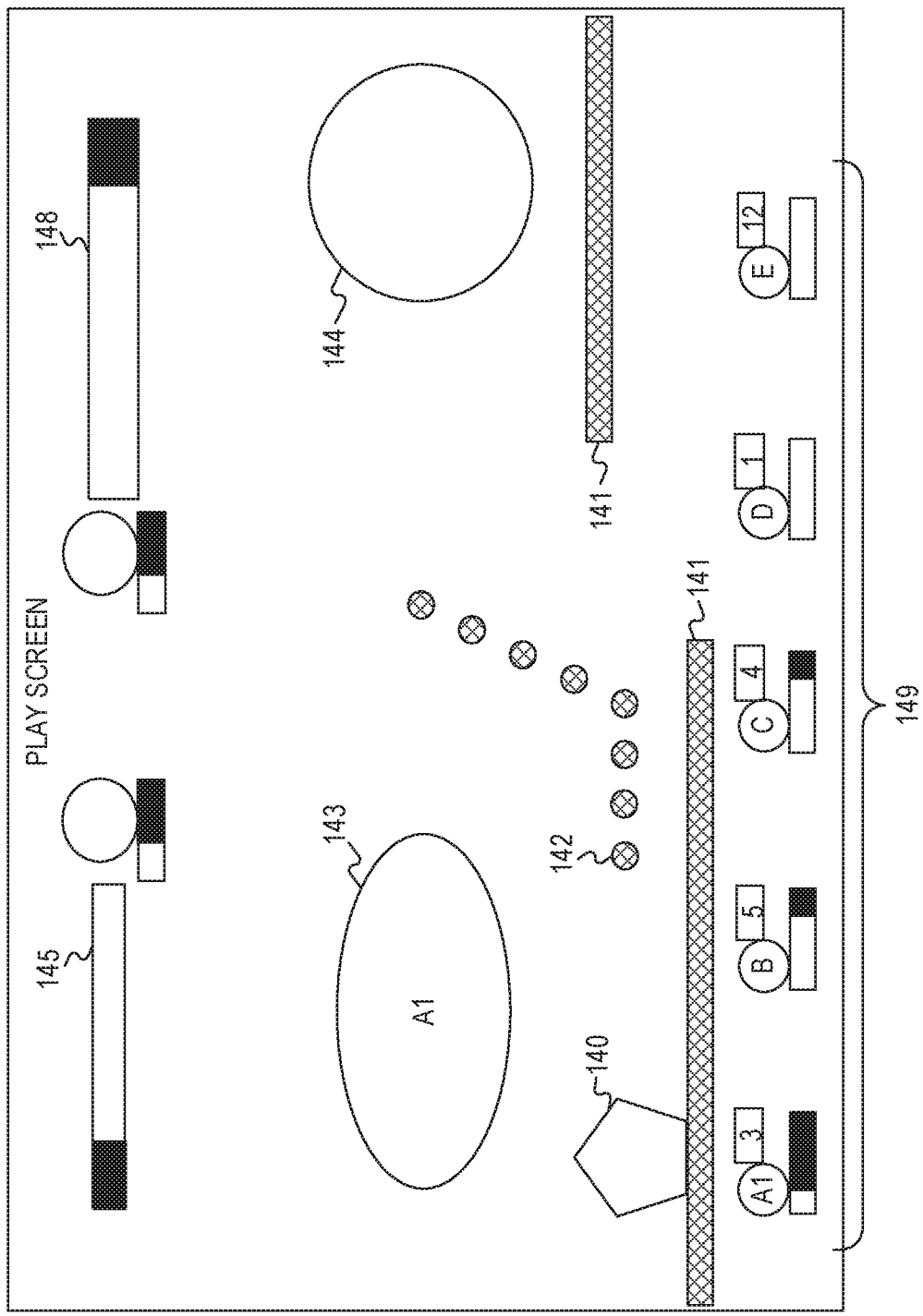
FIG. 2 is a diagram illustrating an example of a play screen for describing an outline of a competition game part.

The outline of the competition game part according to this embodiment will be schematically described with reference to FIG. 2. FIG. 2 illustrates an example of a play screen for describing the outline of the competition game part.

The user playing a competition game part for a single play by using the terminal device 20, for example, acquires a predetermined item while avoiding a barrier or the like by manipulating moving object 140 provided in the virtual space. The moving object 140 corresponds to a predetermined game content (a second game content). The second game content, for example, may include a motorbike, an automobile, a figure, or the like traveling on a road 141. The game media included in the deck (first game media A1, B, C, D, and E) perform a predetermined behavior (for example, an offensive action against the opponent), in accordance with the acquisition of an item 142. The opponent (in FIG. 2, an object 144 according to the opponent is displayed) can be damaged in accordance with the behavior of the first game content. On the other hand, the opponent, for example, performs a predetermined behavior (for example, an offensive action with respect to the user) at predetermined time intervals. The user (in FIG. 2, an object 143 according to the user is displayed) can be damaged in accordance with the behavior of the opponent. In each of the user and the opponent, a predetermined parameter decreasing by the amount of damage (the total HP and HP) is set. Note that, in FIG. 2, an image region 145 is a region for displaying the residual of the total HP with a gauge, an image region 148 is a region for displaying the residual of HP of the opponent with a gauge, and an image region 149 is a region indicating the state of each of the first game media included in the deck. In a case where the parameter of the opponent decreases to a predetermined value (for example, zero), it is determined that the user wins. On the other hand, in a case where the parameter of the user decreases to a predetermined value (for example, zero), it is determined that the user is defeated. In a case where it is determined that the user wins or is defeated, the competition game part may be ended.

On the other hand, a competition game part for a multi-play is executed as with the competition game part for a single play described above, except that two or more users compete with a common opponent. Specifically, each of two or more users plays a common competition game part by using the own terminal device 20. As described above, each of the two or more users manipulates the second game content in the virtual space. A virtual space common to the two or more users may be used, or an independent virtual space may be used for each of the users. The first game content included in the deck of each of the two or more users, for example, performs an offense with respect to the common opponent. The parameter of the opponent described above is applied to two or more users in common. For example, the parameter of the opponent may be synchronized in a plurality of terminal devices 20 that are used by each of two or more users. In a case where the parameter of the opponent decreases to a predetermined value (for example, zero), it is determined that two or more users win. On the other hand, in a case where the parameter of each of two or more users decreases to a predetermined value (for example, zero), it is determined that two or more users are defeated. In a case where it is determined that two or more users win or are defeated, the competition game part may be ended.

Note that, the game described above is merely an example, and this embodiment can also be applied to a fishing game, a running game, a dungeon game, an Othello game, a fighting game, an urban development game, a horseracing game, a sports game such as a baseball game, a shooting game, and the like, in addition to a general role playing game (RPG).

(Regular Purchase Related Function)

In this embodiment, in order to implement a regular purchase service (e.g., a subscription service), the server device 10 further has a function for performing various pieces of processing relevant to the regular purchase contract (hereinafter, also referred to as a "regular purchase related function") ("regular" may refer to a property of being recurring, periodic, for a fixed term, etc.). The regular purchase service is a service for allowing a reward selected by the user who has performed the regular purchase contract (hereinafter, also referred to as a "contractual user") among various providable rewards to be used with respect to the contractual user. Performance of the regular purchase contract may include satisfying the user's obligations of the regular purchase contract. The user's obligations of the regular purchase contract (e.g., the subscription) may include performing the user's side of a regular purchase contract (e.g., fulfilling payment of a certain amount for a certain period, paying a monthly subscription fee, etc.). Note that, hereinafter, unless otherwise stated, the reward indicates a providable reward in the regular purchase service.

Various providable rewards with respect to the contractual user in the regular purchase service may be a reward that is providable not through the network 3, and instead of or in addition to such a reward, may include a reward that is providable through the network 3 (for example, a reward that is providable on a site such as the site A). In this embodiment, as an example, various providable rewards with respect to the contractual user in the regular purchase service include various providable rewards in the site A.

The reward that is providable not through the network 3 is arbitrary, and for example, may be a reward that is available when the contractual user uses a specific physical store. In this case, the reward that is available at the time of using the specific physical store may be a priority reservation of a specific product, a discount of the specific product, free of a delivery charge of the specific product or a discount thereof, the shortening of a delivery time in the case of using the delivery service, free of a use fee in the case of using a parking space or a discount thereof, and the like.

The providable reward in the site A is set in accordance with the site A and is arbitrary, and for example, may include a reward relevant to a specific providable service in the site A. The specific service may be an SNS function, a charging service, or the like. In addition, the specific service, for example, may be a service capable of purchasing a coin that can be used in the site A (A coin described below) on deferred terms (hereinafter, also referred to as a "after payment service"). In this case, a reward relevant to the reception of the specific service in the site A may be a reward for enabling the after payment service to be used, or may be a reward for enabling a spending limit in the after payment service to be increased.

In addition, the providable reward in the site A may include a reward relevant to a providable digital content in the site A. Such a kind of reward, for example, may be a reward for enabling a specific digital content that is providable in the site A to be preferentially acquired, a reward for enabling the providable digital content in the site A to be inexpensively acquired (used), one or more rewards set in a specific digital content that is providable in the site A, and the like. One or more rewards set in the specific digital content that is providable in the site A are arbitrary, and for example, in a case where the specific digital content is the game application, a reward for allowing a predetermined sortition (for example, specific Gacha (Registered Trademark)) to be played, a reward for enabling participation in a specific event, a reward for allowing a participation condition with respect to the specific event to be relaxed, a reward for enabling a specific game content to be acquired, a reward for allowing the specific game content to be easily acquired, a reward for allowing the number of rewards that can be acquired in the specific event or the value thereof to be increased, a reward for allowing an advantageous effect in the specific event to be exerted, and the like. In addition, one or more rewards set in the game application may be a reward not having a relationship with the play, the Gacha, the charging, or the like in the game. In this case, for example, one or more rewards set in the game application may be in the form of a login bonus, a daily bonus, or the like. The login bonus indicates a reward that is offered in the case of performing login for each predetermined period (each day). For example, the login bonus may be applying the specific game content that can be used in the game, applying the A coin, and the like. The daily bonus is a reward that can be acquired once or a predetermined number of times for each day or each period of predetermined days (two or more days). Note that, unlike the login bonus, in the case of the daily bonus, a reward is offered in the case of performing a manipulation that is arbitrarily acquired by the user, but not in the case of performing the login. As with the case of the login bonus, the reward according to the daily bonus may be the specific game content that can be used in the game, the A coin, or the like.

In addition, as the other reward, a parameter or a time necessary for an action that can be performed in the digital content can be reduced. In this case, when the digital content is the game application, for example, it is possible to exert an advantageous effect such as decreasing a cost necessary for executing a specific quest, facilitating the executing of the quest, decreasing a time for constructing a specific building, and facilitating the construction of the specific building, by using the reward. In addition, as the other reward, the type of action that can be performed in the digital content can be increased. In this case, when the digital content is the game application, for example, it is possible to exert an advantageous effect such as constructing a building that is not usually constructed or sending a specific stamp, by using the reward.

Note that, here, in order to describe one or more rewards set in one specific digital content, some specific examples have been described with respect to one or more rewards set in an in-game application, but the specific digital content may be other than the game application. In addition, the digital content in which one or more rewards are set may be a plurality of providable digital contents in the site A.

Figure 3:
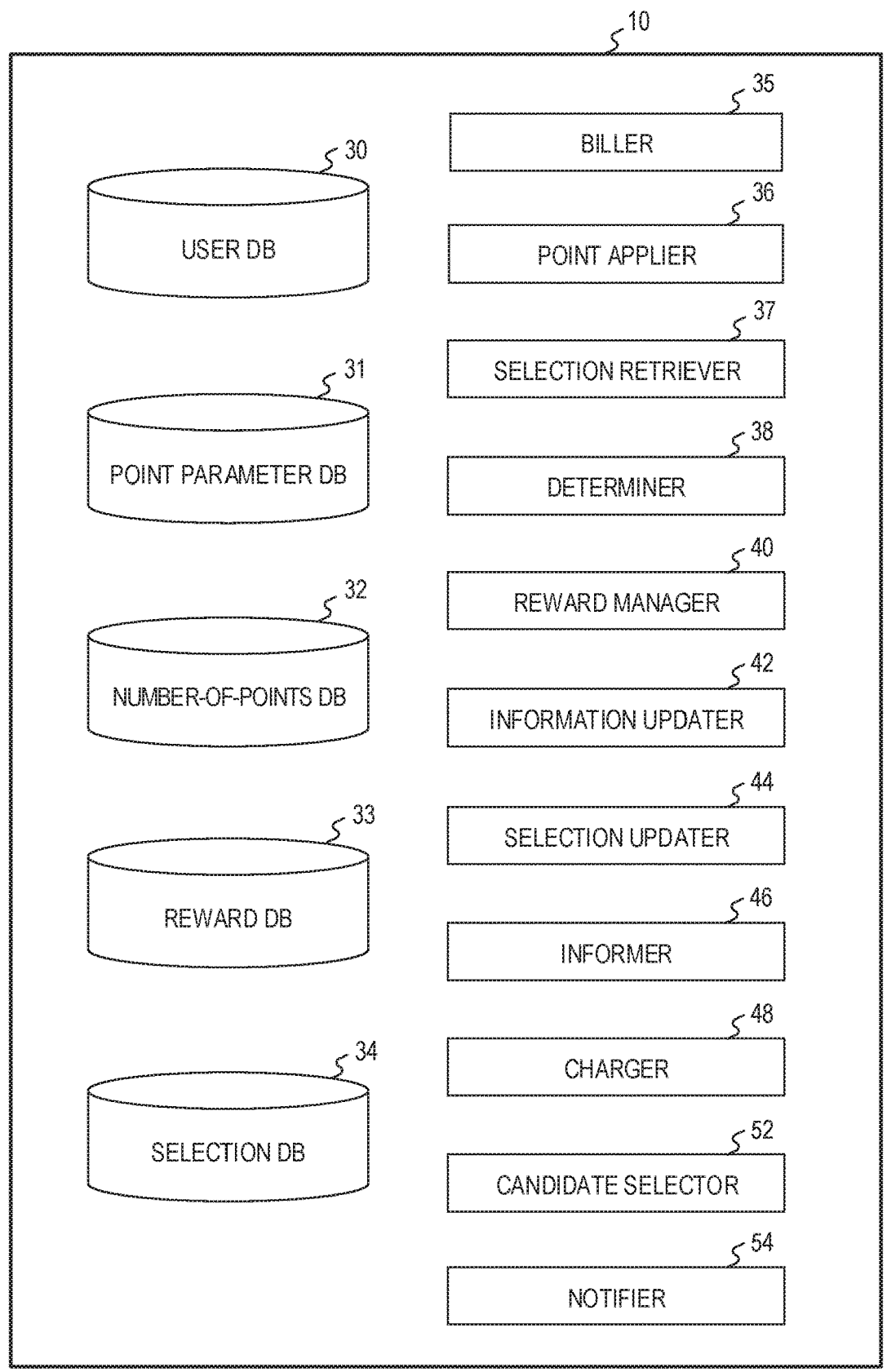
FIG. 3 is a functional block diagram of a function relevant to a regular purchase related function in various functions that are attained by a server device.

FIG. 3 is a functional block diagram of a function relevant to the regular purchase related function in various functions that are attained by a server device 10. FIG. 4 is an explanatory diagram of data in a user DB (database) 30. User DB 30 may include a user information storage unit (e.g., a memory device and a memory controller). Similarly, other databases may include a storage unit and memory controller. In FIG. 4 (the same applies to FIG. 5, FIG. 6, or the like described below), "***" indicates that some information is stored, and " . . . " indicates that the same information is repeated. FIG. 5 is an explanatory diagram of information relevant to the game. FIG. 6 is an explanatory diagram of a point parameter in a point parameter DB 31, FIG. 7 is an explanatory diagram of number-of-points information in a number-of-points DB 32, and FIG. 8 is an explanatory diagram of selection information in a selection DB 34.

As illustrated in FIG. 3, the server device 10 includes the user DB 30, the point parameter DB 31, the number-of-points DB 32, a reward DB 33, the selection DB 34, a biller 35, a point applier 36, a selection retriever 37, a determiner 38, a reward manager 40, an information updater 42, a selection updater 44, an informer 46, a charger 48, a candidate selector 52, and a notifier 54. The point parameter DB 31, the number-of-points DB 32, the reward DB 33, and the selection DB 34, for example, can be attained by the server storage unit 12 illustrated in FIG. 1. In addition, the biller 35, the point applier 36, the determiner 38, the reward manager 40, the information updater 42, the selection updater 44, the charger 48, and the candidate selector 52, for example, can be attained by the server control unit 13 illustrated in FIG. 1. In addition, the selection retriever 37, the informer 46, and the notifier 54, for example, can be attained by the server communication unit 11 and the server control unit 13 illustrated in FIG. 1. Biller 35 may include a billing processing unit. Point applier 36 may include a point applying unit. Selection retriever 37 may include a selection information retrieval unit. Determiner 38 may include a determination unit. Reward manager 40 may include a reward management unit. Information updater 42 may include an information update unit. Selection updater 44 may include a selection information update unit. Informer 46 may include an informing unit. Charger 48 may include a charging unit. Candidate selector 52 may include a candidate selection unit. Notifier 54 may include a notification unit.

Note that, each function unit of the candidate selector 52 is distinguished from the biller 35 for convenience of description, and a part or all of the functions of one specific function unit (the following functions) may be attained by the other function unit. In addition, the same applies to the user DB 30 to the selection DB 34, and a part or all of the functions of one specific function unit (the following functions) may be attained by the other storage unit. In addition, a part of the functions of the server device 10 may be attained by the terminal device 20.

User information according to a user using the site A is stored in the user DB 30. As illustrated in FIG. 4, the user information is associated with a user ID (an example of user identification information), and includes a user name, a password, a phone number, a possessed coin, the information relevant to the game, information relevant to SNS, preference information, and the like. The user information, for example, may include information that is accumulated afterwards, such as the information relevant to the game, along with information that is initially registered, such as the user ID or the user name.

The user ID is information that is capable of uniquely identifying the user. The user ID may be in the form of a user account. Hereinafter, the user ID will be also simply referred to as a user.

The user name is information indicating the name of the user. Unlike the user ID, the user name may not be capable of uniquely identifying the user. The user name may capable of being arbitrarily determined or changed in accordance with the user manipulation with respect to the terminal device 20.

The password is a password for enabling login using the user name to be performed with respect to the site A. A plurality of types of passwords may set in accordance with the application.

The phone number, for example, is a phone number for short message service (SMS) authentication.

The possessed coin represents the number of coins that are possessed by the user (the number of currently available coins). In addition, in this embodiment, as an example, the coin that can be used in the site A (hereinafter, referred to as the "A coin") is provided, and the user consumes the possessed A coin, and thus, it is possible to provide the digital content or to receive various compensations in the game. For example, the user consumes the possessed A coin, and thus, is capable of acquiring a desired first game content or of acquiring a desired item. In addition, for example, it is possible to play Gacha by consuming the possessed A coin. Note that, in the modification example, the A coin may be a game content that can be used only in the game. An initial value of the possessed coin, for example, is 0. As described below, the possessed coin can be updated by the charger 48.

As illustrated in FIG. 5, the information relevant to the game may include a rank, information relevant to the possessed game content, information relevant to a used game content, and friend information, for each user ID.

The rank is a parameter indicating the level of skill of the user relevant to the game. In this embodiment, the value of the rank may increase in accordance with the play of the game by the user. The level of skill of the user relevant to the game is high as the rank is high.

The information relevant to the possessed game content includes various information items unique to the game content that is possessed by the user in the game (the possessed game content). In a case where the game content is retrieved by the user, the game content is associated with the user as the possessed game content. The details of the information relevant to the possessed game content are omitted, and the information relevant to the possessed game content may include a game content name, rarity, a level, a cost, a hitpoint (HP), offensive power, resilience, and the like, for each game content ID.

The information relevant to the used game content is information indicating a game content that is used by the user in the competition game part (the first game content). The first game content is selected from the possessed game media. In this embodiment, for example, up to five game media selected from one or more possessed game media are respectively associated with the user as the first game content. Accordingly, one game content can be the possessed game content and the first game content. The first game content, for example may be selected automatically or in accordance with the user manipulation, in a dedicated game part. For example, the dedicated game part may include a game part performing so-called deck organization, team organization, or the like. Up to five first game media indicated by the information relevant to the used game content configure one deck. The information relevant to the used game content may include information of a plurality of decks.

The friend information represents a user ID having a friend relationship in the game. For example, in a case where the user A has a friend relationship with users B and C, friend information associated with the user A includes user IDs of the users B and C. Note that, the friend relationship is attained through a friend application or the like. As described above, the friend information includes a user ID of another user who is unidirectionally or bidirectionally associated with the user. Note that, users having a friend relationship, for example, may be capable of performing communication such as the transmission and reception of a message, in the game. Note that, the information relevant to the user may include information indicating a group (for example, a guild or a party) to which the user belongs, instead of or in addition to the friend information.

Note that, the contents of the information relevant to the game is not limited to the above. For example, the information relevant to the user may further include information indicating predetermined in-game points that are self-retained by the user in the game. The in-game points are consumed in order for the user to play the game part. A consumed amount of the in-game points may be different for each game part. The in-game points, for example, may increase over time or in accordance with the use of a predetermined game content.

The information relevant to SNS may include various information items relevant to the SNS function. For example, the information relevant to SNS may include information relevant to an avatar, the friend information, or the like, for each user ID. The information relevant to the avatar may include clothing information for dress-up, and the like. The friend information may represent user IDs or group IDs that are connected through the SNS function. The friend information may be identical to or different from friend information in the game.

The preference information includes information representing the preference of the user or information capable of deriving the preference of the user. The information representing the preference of the user may be information representing which service or reward in the service the user has a preference for, which service or reward the user does not have a preference for, which service or reward the user has an interest in, which service or reward the user does not have an interest in, or the like. The preference information, for example, may be generated based on a simple questionnaire survey in the initial registration. In addition, the information capable of deriving the preference of the user may be log information of the user, and the like. In this case, the log information that is an accumulation target may be all log information items that can be relevant to the preference of the user, or may be specific log information (for example, log information relevant to a manipulation log). The log information represents various activities in the site A based on each user ID (login, logout, the use of the digital content, the access/use with respect to the SNS function, charging, and the like). In addition, the log information that is the accumulation target may include log information relevant to the play of the game.

The point parameter DB 31 stores the parameter information representing the point parameter (e.g., point parameter k1) for each type of regular purchase contract. The type of regular purchase contract may be one type. In this embodiment, as an example, the type of contract, as illustrated in FIG. 6, includes two types: a "regular purchase contract A1" and a "regular purchase contract A2". The point parameter is a parameter for calculating a predetermined point described below. The term "predetermined point" may refer to designated units of counting, scoring, etc., e.g., a virtual currency. It will be understood that a "predetermined point" may refer to a plurality of points. In FIG. 6, the value of a point parameter according to the "regular purchase contract A1" is "5", and the value of a point parameter according to the "regular purchase contract A2" is "10".

Note that, in the example illustrated in FIG. 6, an amount (a monthly amount) that is paid by the contractual user in the regular purchase contract is indicated in the point parameter DB 31, for each type of regular purchase contract.

In a case where the type of regular purchase contract is changed (for example, in a case where one type is deleted or one new type is added), the parameter information of the point parameter DB 31 is updated in accordance with the change.

The number-of-points DB 32 stores number-of-points information representing the number of points associated with the use of a reward, for each reward, of a plurality of providable rewards in the regular purchase service. In FIG. 7, a "reward B1", a "reward B2", and the like are provided as the plurality of providable rewards in the regular purchase service, and the number of points (the number of points necessary for the use of the reward; e.g., the cost) is defined with respect to each of the rewards.

In a case where the providable reward in the regular purchase service is changed (for example, in a case where one reward is deleted or one new reward is added), the number-of-points information in the number-of-points DB 32 is updated in accordance with the change.

In this embodiment, the number of the plurality of providable rewards in the regular purchase service is significantly greater than the number of types of regular purchase contracts. For example, the number of types of regular purchase contracts may be approximately 2 to 5, whereas the number of the plurality of providable rewards in the regular purchase service, for example, may be greater than or equal to 10. Note that, the number of the plurality of providable rewards in the regular purchase service or the number of types of regular purchase contracts is capable of suitably increasing or decreasing during the operation, and even in such a case, a relationship that the number of the plurality of providable rewards in the regular purchase service is significantly greater than the number of types of regular purchase contracts is maintained.

The reward DB 33 stores reward information relevant to the plurality of providable rewards in the regular purchase service (not illustrated). The reward information may include information representing the contents of the reward. In a case where the providable reward in the regular purchase service is changed (for example, one reward is deleted or one new reward is added), the reward information in the reward DB 33 is updated in accordance with the change.

The selection DB 34 stores selection information for each contractual user. The selection information is selection information associated with the user ID, and represents one or more rewards that are selected by the contractual user, in the plurality of providable rewards in the regular purchase service. In the example illustrated in FIG. 8, three rewards including a "reward B1", a "reward C1", and a "reward D1" are associated with a user ID "U01", and four rewards including a "reward B2", a "reward C1", a "reward D95", and a "reward E60" are associated with a user ID "U03". In this case, it is represented that the three rewards including the "reward B1", the "reward C1", and the "reward D1" are selected by a contractual user according to the user ID "U01", and it is represented that the four rewards including the "reward B2", the "reward C1", the "reward D95", and the "reward E60" are selected by a contractual user according to the user ID "U03".

The biller 35 performs various pieces of billing processing based on the regular purchase contract. For example, in the example illustrated in FIG. 6, the biller 35 performs payment processing of "500 yen" (for example, automatic withdrawal processing from a registered account) with respect to the contractual user having the "regular purchase contract A1", for each month, and performs payment processing of "1000 yen" with respect to a contractual user having the "regular purchase contract A2", for each month. Note that, in a case where the payment processing is ended, the biller 35 may notify the contents to the corresponding contractual user. Such a notification may be attained through the site A, or may be attained by an e-mail or the like. Note that, a monthly billing amount (a billing amount according to the regular purchase contract) is basically constant, but may be suitably changed. For example, the biller 35 may bill an amount different from a regular monthly charging amount only in a specific period. In addition, in a case where a campaign such as free in the first month or free in the birthday month is performed, the biller 35 may execute the billing processing according to the contents of the campaign.

The point applier 36 associates the predetermined point according to the type of regular purchase contract with the user ID according to the contractual user, for each predetermined period ΔT1 according to the regular purchase contract. The predetermined period ΔT1 is arbitrary, may be different in accordance with the type of regular purchase contract, and in this embodiment, is a fixed month. The predetermined point is set in accordance with the type of regular purchase contract. In this embodiment, as an example, the predetermined point is set based on the point parameter associated with the type of regular purchase contract. Specifically, the point applier 36 determines the predetermined point based on the value of the point parameter associated with the type of regular purchase contract by the contractual user, with reference to the parameter information in the point parameter DB 31. For example, the point applier 36 determines (calculates) a predetermined point pt from a value k1 of the point parameter by the following calculation expression.

$$pt = k1 \times 10$$

In this case, in a case where the point parameter is "5", the predetermined point is "50", and in a case where the point parameter is "10", the predetermined point is "100". Note that, in the modification example, the value of the point parameter may be a parameter representing the predetermined point itself. In addition, in another modification example, the point parameter may represent the type of regular purchase contract but not the parameter such as a numerical value. In any case, the point applier 36 determines the predetermined point based on the point parameter associated with the type of regular purchase contract by the contractual user with reference to the parameter information in the point parameter DB 31.

Note that, a timing when the predetermined point is applied by the point applier 36 is arbitrary, and may be different for each contractual user, or may be constant. For example, the timing may be every other month according to a contract date. In this case, for example, an update timing is different for each user, such as 26th and 23rd of the month. However, in this embodiment, as an example, the timing when the predetermined point is applied by the point applier 36 is a contract timing in the case of a new contractual user, and is uniformly the beginning of month (for example, a time point when the account closing processing by the biller 35 is ended) in the case of the other contractual user. Note that, in a case where the current time point is 0:00 at the beginning of month, automatically, the point applier 36 may automatically associate the predetermined point according to the type of regular purchase contract with the user ID of each of the contractual users, based on date and time information.

Note that, in this embodiment, the point applier 36 associates the predetermined point according to the type of regular purchase contract with each predetermined period ΔT1 according to the regular purchase contract, regardless of the selection information according to the contractual user in the latest predetermined period ΔT1, for each predetermined period ΔT1. That is, in this embodiment, even in a case where one contractual user selects only a reward costing a number of points significantly less than the predetermined point, in the latest predetermined period ΔT1, the difference point is not carried over to the next predetermined period ΔT1. However, in the modification example, the point may be carried over.

In addition, in a case where a point increase campaign in which the predetermined point pt to be applied in a specific month such as the first month or the birthday month is greater than that in normal times is performed, the point applier 36 may apply the predetermined point pt according to the contents of the campaign to each of the contractual users. In this case, each of the contractual users is capable of using an additional reward only in the specific month, as a "trial", and thus, convenience is improved. Then, in a case where a trial result of the additional reward is excellent, each of the contractual users is capable of changing the selection information for incorporating the additional reward from the next month. Note that, in such a modification example, selection information for a specific month and selection information for a normal month may be set.

The selection retriever 37 retrieves the selection information from each of the contractual users. The selection information is as described above. The selection retriever 37 stores the retrieved selection information in the selection DB 34.

The determiner 38 determines whether or not the total number of points associated with one or more rewards selected by the contractual user has a predetermined relationship with the predetermined point associated by the point applier 36 (the predetermined point associated with the user ID according to the corresponding contractual user), for each of the contractual users.

The total number of points associated with one or more rewards selected by the contractual user is set based on the selection information in the selection DB 34 (the selection information according to the corresponding contractual user) and the number-of-points information in the number-of-points DB 32. That is, for one contractual user, the "total number of points associated with one or more rewards selected by the one contractual user" is the total number of points associated with the reward represented by the selection information according to the one contractual user. Hereinafter, the total number of points will also be referred to as "total points of the selected reward".

For example, in the example illustrated in FIG. 8, the selection information according to the user ID "U01" represents that three rewards including the "reward B1", the "reward C1", and the "reward D1" are selected by the contractual user according to the user ID "U01". In this case, according to the number-of-points information in the number-of-points DB 32 (refer to FIG. 7), in a case where the number of points associated with each of the "reward B1", the "reward C1", and the "reward D1" is pt1, pt2, and pt3, the total number of points of the selected reward is the total number of points associated with the "reward B1", the "reward C1", and the "reward D1", and is pt1+pt2+pt3. Accordingly, in this case, the determiner 38 determines a relationship between the predetermined point associated with the user ID "U01" and the total number of points of the selected reward (=pt1+pt2+pt3). Note that, in this case, as described above, the predetermined point pt is pt=k1×10, based on the value k1 of the point parameter associated with the user ID "U01".

In this embodiment, as an example, the predetermined relationship is a relationship in which the total points of the selected reward is less than or equal to the predetermined point. In this case, the determiner 38 executes determination processing for determining whether or not the total points of the selected reward is less than or equal to the predetermined point.

Here, selection information representing that a reward is selected such that the total points of the selected reward is greater than the predetermined point is referred to as "selection information required to be reselected", and the other selection information (that is, selection information representing that a reward is selected such that the total points of the selected reward is not greater than the predetermined point) is referred to as "selection information not required to be reselected". Note that, in this embodiment, the selection DB 34 stores only the selection information not required to be reselected.

A determination method of the determiner 38 may be different in accordance with whether or not the selection information required to be reselected can be included in the selection information retrieved by the selection retriever 37. For example, in a case where the selection information required to be reselected can be included in the selection information retrieved by the selection retriever 37, the determiner 38 may execute determination processing based on the selection information retrieved by the selection retriever 37. On the other hand, in a case where the selection information required to be reselected is not included in the selection information retrieved by the selection retriever 37 (for example, in a case where the selection of the contractual user is executed in the terminal device 20 such that only the selection information not required to be reselected is transmitted to the server device 10), the determiner 38 may perform the determination based on whether or not the selection information is retrieved by the selection retriever 37. In this case, in a case where the selection information is retrieved by the selection retriever 37, the determiner 38 may determine that the total points of the selected reward based on the selection information have the predetermined relationship with the predetermined point (that is, may determine that the selection information is "selection information not required to be reselected").

Note that, in this embodiment, the notifier 54 described below performs notification processing for notifying a combination of the rewards to the contractual user or the like, in a mode in which only the selection information not required to be reselected is retrieved. That is, the notifier 54 described below notifies a selectable combination in a range in which the total points of the selected reward is not greater than the predetermined point to one contractual user (or a non-contractual user). Accordingly, in this embodiment, the user performs the selection based on the notification of the notifier 54, and thus, only the selection information not required to be reselected is transmitted to the server device 10. That is, in this embodiment, the selection of the contractual user is executed in the terminal device 20 such that only the selection information not required to be reselected is transmitted to the server device 10.

In a case where the determiner 38 determines that the total points of the selected reward based on the selection information have the predetermined relationship with the predetermined point, with respect to one contractual user, the reward manager 40 enables the use of one or more selected rewards by the contractual user. That is, one or more selected rewards based on the user identification information can be used. Processing for enabling the use of the reward by the reward manager 40 may be attained in a suitable mode according to the attribute of each of the rewards. For example, in a case where the attribute of the reward is a reward that is available at the time of using a specific physical store, the processing for enabling the reward to be used may be attained by issue processing of a coupon for allowing the reward to be used. Note that, such a coupon may be transmitted to the terminal device 20 as an electronic coupon, or may be in the mail as a printed coupon. In addition, in a case where the attribute of the reward is the providable reward in the site A, the processing for enabling the reward to be used is processing for allowing the reward in the site A to be used. For example, in a case where the providable reward in the site A is the reward for enabling the participation in the specific event, the processing for enabling the use of the reward may be processing for transmitting an invitation ticket with respect to the specific event to the terminal device 20 as an electronic ticket, processing for allowing a participation button to appear on a home screen of the game application, and the like.

In addition, the reward manager 40 may suitably restrict the use of the reward, in accordance with a use situation of the reward. For example, in a case where the reward is available only once a month, and the reward is used by one contractual user, the reward manager 40 restricts the use of the reward by the one contractual user in the month.

The information updater 42 updates the number-of-points information in the number-of-points DB 32 or the reward information in the reward DB 33, in accordance with a change such as addition or deletion with respect to the providable reward in the regular purchase service. In addition, the information updater 42 updates the parameter information in the point parameter DB 31, in accordance with a change such as addition or deletion with respect to the type of regular purchase contract.

The selection updater 44 updates the selection information in the selection DB 34, in accordance with a change instruction of the selection information by the contractual user. Note that, the contractual user is capable of freely changing the selection information in a range in which the total points of the selected reward are not greater than the predetermined point. That is, the contractual user is capable of reselecting a desired reward. However, such a change may be available for each predetermined period ΔT1. In addition, in a case where selection information from a new contractual user is retrieved by the selection retriever 37, the selection updater 44 updates the selection information in the selection DB 34.

However, in this embodiment, under the premise that a regular purchase contract according to one contractual user is maintained, the selection information in the selection DB 34, according the one contractual user, is maintained without being changed, unless there is no change instruction of the selection information by the one contractual user.

However, the change such as the addition or the deletion can be suitably performed with respect to the providable reward in the regular purchase service. For example, in a case where one reward of the providable rewards in the regular purchase service is ended, but a new equivalent reward instead of the certain reward is newly set, it can be cumbersome for a contractual user selecting the one reward to perform a selection operation for reselecting each new equivalent reward.

Figures 9, 10:
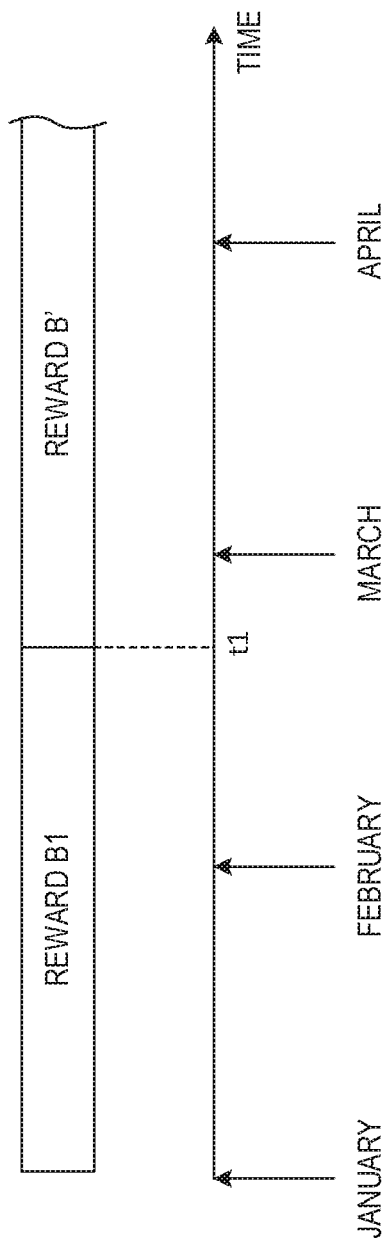
FIG. 9 is an explanatory diagram of automatic update processing.
FIG. 10 is an explanatory diagram of the selection information in the selection information storage unit after the automatic update processing.

Therefore, in a case where there is a specific change in the providable reward in the regular purchase service, the selection updater 44 preferably executes automatic update processing for automatically updating the selection information in the selection DB 34 in accordance with the specific change. FIG. 9 is an explanatory diagram of the automatic update processing. FIG. 10 is an explanatory diagram of the selection information in the selection DB 34 after the automatic update processing. FIG. 9 illustrates that the "reward B1" (an example of a first reward) is ended (unavailable) at a time point t1 from February to March (an example of a certain timing), and a "reward B1'" (an example of a second reward) is available from the time point t1, in chronological order. The "reward B1'" is a reward relevant to the "reward B1". Here, the relationship between the rewards may include not only a relationship in which there is a difference in versions or detailed specifications, but also a relationship in which the attributes of the rewards are the same but there is a significant difference in the specifications. For example, in a case where the reward B1 is provided only in a certain period and is not provided from the next period, the "reward B1'" may be a reward functioning as a succession (a subsequent version) of the "reward B1". In this case, as illustrated in FIG. 10, the selection updater 44 executes rewriting for changing a selection target to the "reward B1'" from the "reward B1" with respect to selection information including the "reward B1" as the selection target (in FIG. 10, the selection information according to the user ID "U01"), and thus, attains the automatic update processing. Accordingly, it is possible to automatically update the selection information in accordance with the specific change of the providable reward in the regular purchase service, without causing the contractual user to perform cumbersome input for a change or the like, and thus, a user-friendly configuration can be attained.

Note that, in FIG. 9, in a case where the selection updater 44 executes the automatic update processing as described above, one of the rewards that can be used by the contractual user according to the user ID "U01" is changed to the "reward B1'" from the "reward B1", from the time point t1. According to this, the reward manager 40 changes one of the rewards that can be used by the contractual user according to the user ID "U01" to the "reward B1'" from the "reward B1".

Note that, in the example illustrated in FIG. 9, the time point t1 is in the middle of the month but not the beginning of month, but may be the beginning of month. In this case, a change timing to the "reward B1'" from the "reward B1" is synchronized with a start timing of each predetermined period ΔT1 of the regular purchase contract. In addition, in the example illustrated in FIG. 9, a timing when the "reward B1'" is unavailable and a timing when the "reward B1'" is available are the same time point t1, but the timings may be shifted from each other. For example, the timing when the "reward B1'" is available may be earlier than the timing when the "reward B1" is unavailable. In this case, a period in which both of the "reward B1" and the "reward B1'" can be selectively used is set as a transition period. As described above, it is not necessary that the timing when the "reward B1'" is available is identical to the timing when the "reward B1" is unavailable, insofar as the timing when the "reward B1'" is available is set in accordance with the timing when the "reward B1" is unavailable.

Note that, whether or not such automatic update processing is executed for each contractual user may be determined. For example, whether or not the contractual user wants such automatic update processing may be checked in advance (for example, at the contract or the like). In this case, it is possible to attain the automatic update processing in a mode according to the intention of each of the contractual users. Note that, a notice for asking the selection operation for reselecting the reward may be suitably transmitted (notified) to a contractual user who does not want the automatic update processing. Note that, such a notification may be attained in the same mode as that of the informing of the informer 46 described below.

In a case where the automatic update processing (the rewriting of the selection information) is executed by the selection updater 44, the informer 46 informs an informing destination associated with the user identification information of information relevant to the rewriting, based on the user identification information associated with the selection information in which the automatic update processing is executed. Note that, an informing method is arbitrary, and may be attained by informing by an e-mail, informing in an application, informing by a chatting function in the site A, informing by a telephone, informing by a printed mail, or the like. For example, in the example illustrated in FIG. 10, the informer 46 may inform a phone number that is an example of the informing destination associated with the user ID "U01" (refer to FIG. 4) of the information relevant to the rewriting by SMS.

The charger 48 executes processing relevant to the charging service. In this embodiment, as an example, the A coin is available in the site A. In this case, in a case where a request for providing (purchasing) the A coin is received from the user, the charger 48 provides the A coin to the user in a predetermined condition. Here, the user includes a user other than the contractual user, and hereinafter, the same applies to the description of the charger 48. Note that, the charger 48 may provide the A coin to the user by using payment at the time point instead of after payment, as a condition, or may provide the A coin to the user by the after payment, based on the after payment service.

In addition, in a case where a request for consuming the A coin is received from the user, the charger 48 attains the consumption of the A coin and enables the use of a predetermined reward according to the consumption by the user. Accordingly, in this embodiment, the user consumes the A coin, and thus, is capable of using the predetermined reward in the site A. The predetermined reward may be a reward for enabling a desired first game content to be retrieved, a reward for enabling a desired item to be retrieved, a reward for enabling a desired Gacha to be played, and the like.

In this embodiment, the providable reward in the regular purchase service preferably includes a reward different from the predetermined reward that is available by consuming the A coin. For example, a part of the plurality of providable rewards in the regular purchase service is identical to the predetermined reward that is available by consuming the A coin, but the other of the plurality of providable rewards in the regular purchase service is different from the predetermined reward that is available by consuming the A coin. Accordingly, for example, an operation side prepares an attractive reward that can be used only in the case of using the regular purchase service, and thus, it is possible to effectively accelerate the use of the regular purchase service. In addition, compartmentalization between the regular purchase service and the charging service can be performed, and a reward according to the feature of the regular purchase service can be designed. Note that, in the modification example, the charging service may be omitted and may be integrated in the regular purchase service.

Note that, even in a case where a part of the plurality of providable rewards in the regular purchase service is identical to the predetermined reward that is available by consuming the A coin, the regular purchase service may be designed to be more advantageous than the charging service, in the cost. Accordingly, it is possible to effectively accelerate the use of the regular purchase service. In addition, all of the predetermined rewards that are available by consuming the A coin may be the providable reward in the regular purchase service. Accordingly, the regular purchase service is superior to the charging service, and the use of the regular purchase service can be effectively accelerated.

The candidate selector 52 selects one or more combination candidates from the selectable combinations in the range in which the total points of the selected reward is not greater than the predetermined point, in various combinations of the plurality of providable rewards in the regular purchase service. That is, the candidate selector 52 selects one or more combination candidates in which the total points of the selected reward have the predetermined relationship with the predetermined point.

In this case, the candidate selector 52 may randomly select one or more combination candidates. However, the candidate selector 52 preferably selects one or more combination candidates to be recommended, for each user. Here, the user includes a user other than the contractual user, and hereinafter, the same applies to the description of the candidate selector 52 and the candidate selector 52.

For example, the candidate selector 52 selects one or more combination candidates conforming to the preference of the user, based on preference information of the user information in the user DB 30. For example, for a certain user, in a case where preference information according to the user indicates that the user has high preference with respect to a specific game application, one or more combination candidates may be selected in a mode including at least one reward set in the specific game application.

Alternatively, the candidate selector 52 selects one or more combination candidates conforming to the user, based on the log information of the user information in the user DB 30.

For example, for a certain user, in a case where a progression situation of the game by the user is derived from log information according to the user, and according to the progression situation, a specific reward set in the game application is useful, one or more combination candidates may be selected in a mode including at least one specific reward. The progression situation of the game, for example, is a state or a situation indicating how much of which content in the game is consumed (attained/cleared). For example, in a game in which a stage or a level, a story, or the like is changed in a case where a mission or a quest is cleared, the progression situation may be the current stage, the current level, or the like of the user. In this case, the specific reward may be a reward that can be different in accordance with the stage, the level, or the like, and may be a useful reward for further progress of the game. Note that, the progression situation of the game is derived directly or indirectly based on the log information, and for example, may be derived from the information relevant to the game (refer to FIG. 5), or may be a part of the information relevant to the game. Note that, the information relevant to the game is generated based on the log information. In this case, the user is capable of deriving or predicting a manipulation that is to be or may be performed next based on the progression situation of the user, and of presenting a reward suitable for the manipulation. Note that, such prediction of the manipulation may be attained by using artificial intelligence. For example, it is also possible to input the log information and to output (generate) a prediction result of the manipulation, by using the artificial intelligence. In the case of the artificial intelligence, the prediction of the manipulation can be attained by implementing a convolutional neural network that is obtained by machine learning. In the machine learning, for example, the weight of the convolutional neural network that minimizes an error in the prediction result, or the like is learned by using the performance data according to the log information.

Alternatively, for a certain user, in a case where a manipulation tendency of the user is derived from log information according to the user, and according to the manipulation tendency, a specific reward set in the game application is useful, one or more combination candidates may be selected in a mode including at least one specific reward. In this case, the user is capable of deriving or predicting a manipulation that is to be or may be performed next based on manipulation information of the user, or the like, and of presenting a reward suitable for the manipulation. Note that, similarly, such prediction of the manipulation may be attained by using artificial intelligence. For example, it is also possible to input the log information and to output (generate) a prediction result of the manipulation, by using the artificial intelligence. In the case of the artificial intelligence, the prediction of the manipulation can be attained by implementing a convolutional neural network that is obtained by machine learning. In the machine learning, for example, the weight of the convolutional neural network that minimizes an error in the prediction result, or the like is learned by using the performance data according to the log information.

Note that, a selection method of one or more combination candidates, based on the progression situation or the manipulation tendency of the game described above is not limited to a game application, and can also be applied to other applications.

Note that, an execution timing of selection processing by the candidate selector 52 may be a timing according to a notification timing of the notifier 54 described below. For example, a timing of the selection processing with respect to one or more combination candidates according to one user by the candidate selector 52 may be an application timing of regular purchase of the one user (an execution timing of the regular purchase contract), or may be an update timing of the regular purchase contract of the one user (the contractual user) (in this embodiment, the beginning of month as an example).

However, as described above, the plurality of providable rewards in the regular purchase service can be changed afterwards. In addition, the preference of the contractual user, the progression situation of the game by the contractual user, the manipulation tendency of the contractual user, or the like can also be changed afterwards. Accordingly, candidate selector 52 preferably selects one or more combination candidates conforming to the preference of the user, the progression situation of the game by the user, the manipulation tendency of the user, or the like, based on the user information in the user DB 30, periodically or non-periodically even at a timing other than the execution timing of the regular purchase contract. Note that, in this case, the notification timing of the notifier 54 described below may be synchronized with a selection timing of the candidate selector 52. Accordingly, it is possible to present a reward conforming to the user, to the user, in accordance with various changes that are performed afterwards.

Here, in a case where candidate selector 52 executes the selection processing based on the user information, as described above, an execution condition of the selection processing may be limited to a case where there is a significant change in the user information and/or a case where there is a change in the providable reward in the regular purchase service. For example, a timing of the selection processing with respect to one or more combination candidates according to one user by the candidate selector 52 may be set in a case where the preference of the user, based on user information of the one user, the progression situation of the game by the user, the manipulation tendency of the user, or the like is significantly changed. Accordingly, it is possible to reduce an execution frequency of the selection processing by the candidate selector 52, and thus, to efficiently reduce the processing load.

The notifier 54 notifies one or more selectable combinations in the range in which the total points of the selected reward is not greater than the predetermined point, in various combinations of the plurality of providable rewards in the regular purchase service, to the user. Note that, a notification method is arbitrary, and may be identical to the informing method of the informer 46 described above. In addition, the notification timing of the notifier 54 is also arbitrary, and for example, may be the application timing of the regular purchase, may be the update timing, or may be synchronized with the selection timing of the candidate selector 52 described above. In addition, in a case where notice information according to the regular purchase service is posted in the site A, a notification with respect to the user may be executed when the user browses the notice information.

The user who has received the notification from the notifier 54 selects one desired combination from one or more notified combinations, and thus, the "selection information not required to be reselected" can be transmitted to the server device 10.

In this embodiment, the notifier 54 may notify one or more combinations that are randomly selected (however, combinations in which the total points of the selected reward is not greater than the predetermined point), and preferably notifies one or more combination candidates that are selected by the candidate selector 52. Accordingly, it is possible to notify a combination candidate that is more likely to conform to the preference of the user, the progression situation of the game by the user, the manipulation tendency of the user, or the like, for each user, and thus, a desired reward is easily selected by the user. That is, presentation based on such notification is performed on a selection screen described below (refer to FIG. 13 or FIG.

14A), and thus, it is possible to attain a user interface (UI) in which a desired reward is easily selected by the user.

Figure 11:
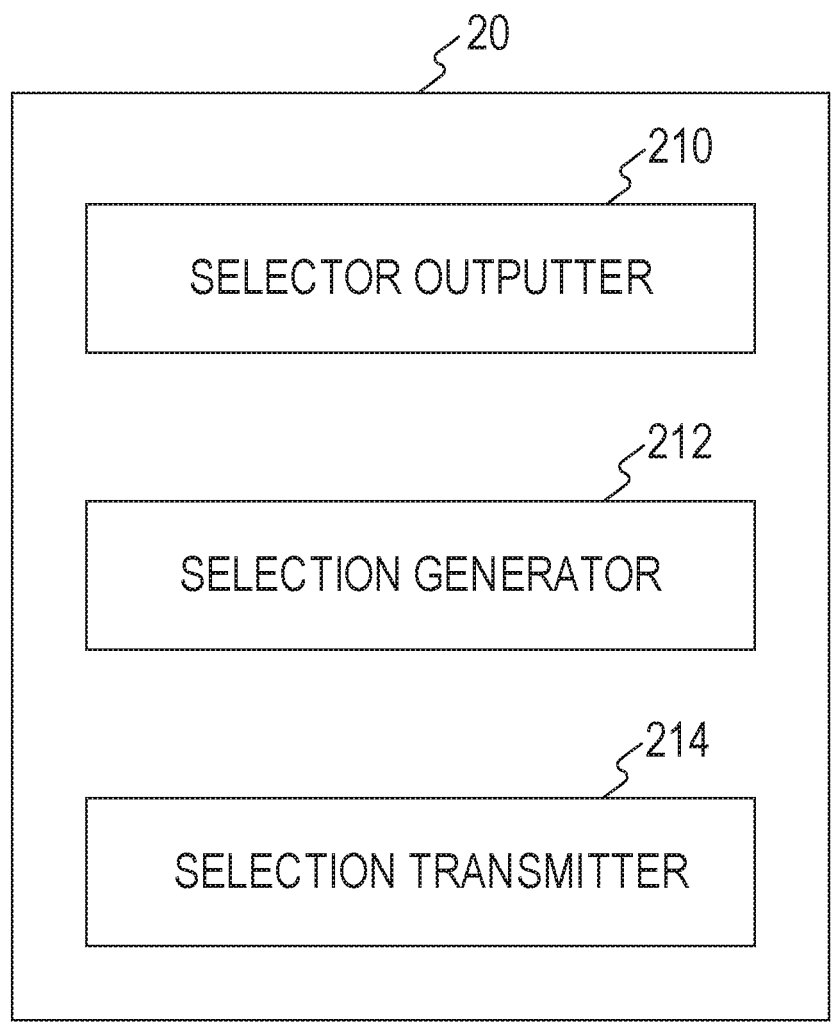
FIG. 11 is a functional block diagram of a function relevant to a regular purchase related function in various functions that are attained by a terminal device.
Figure 12:
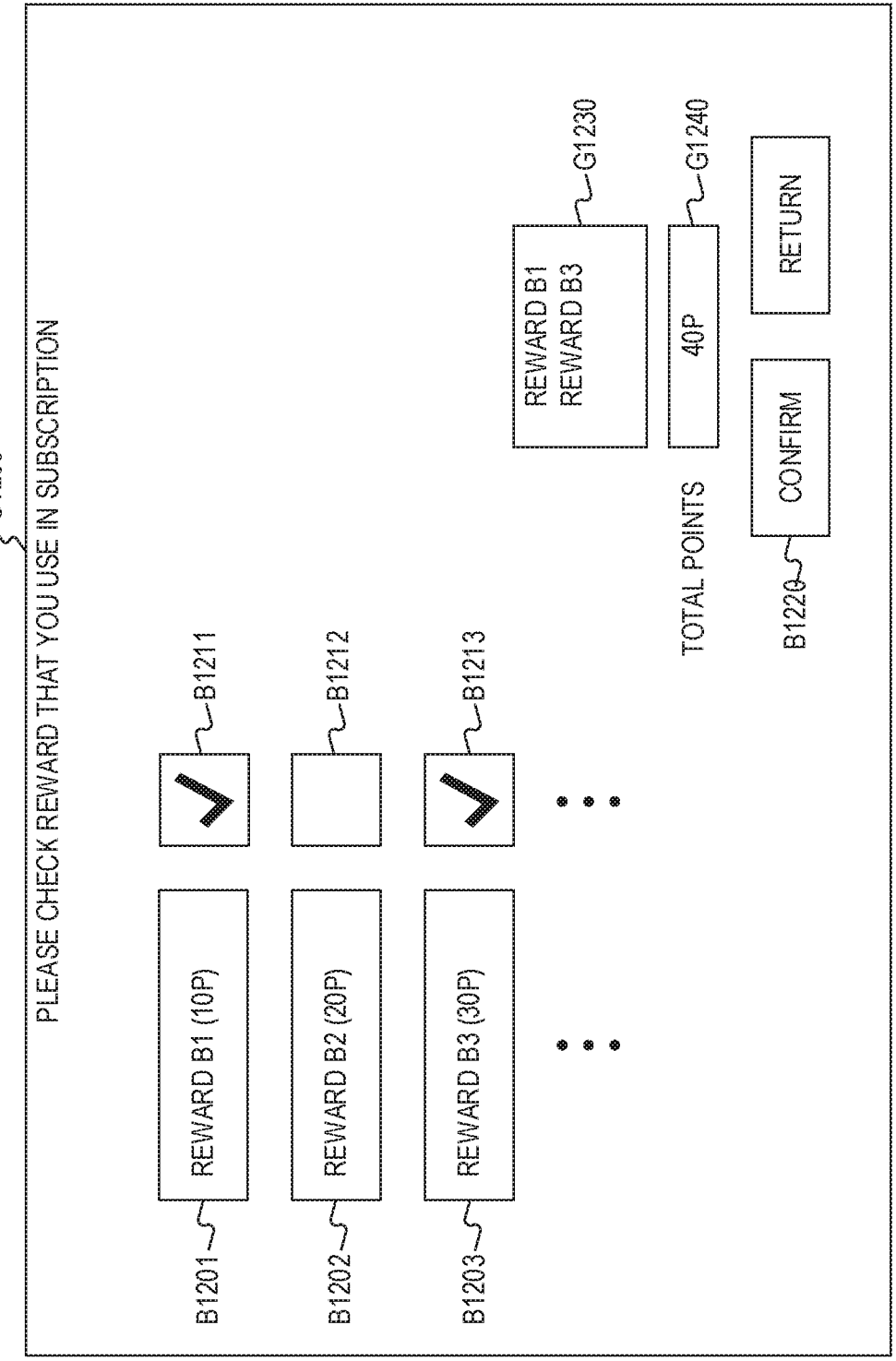
FIG. 12 is an explanatory diagram of an example of a selection method of a plurality of providable rewards in a regular purchase service.
Figure 13:
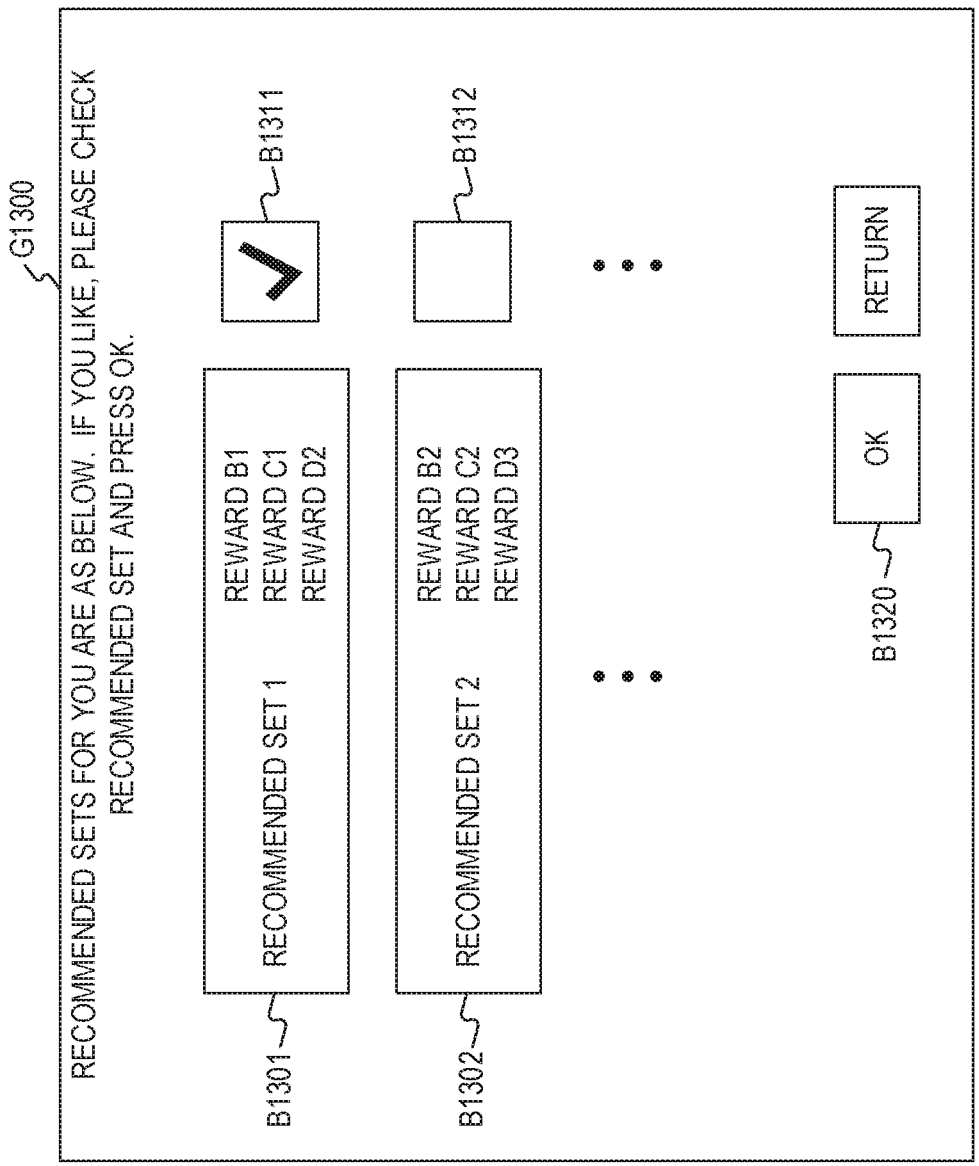
FIG. 13 is an explanatory diagram of another example of the selection method of the plurality of providable rewards in the regular purchase service.
Figure 14A:
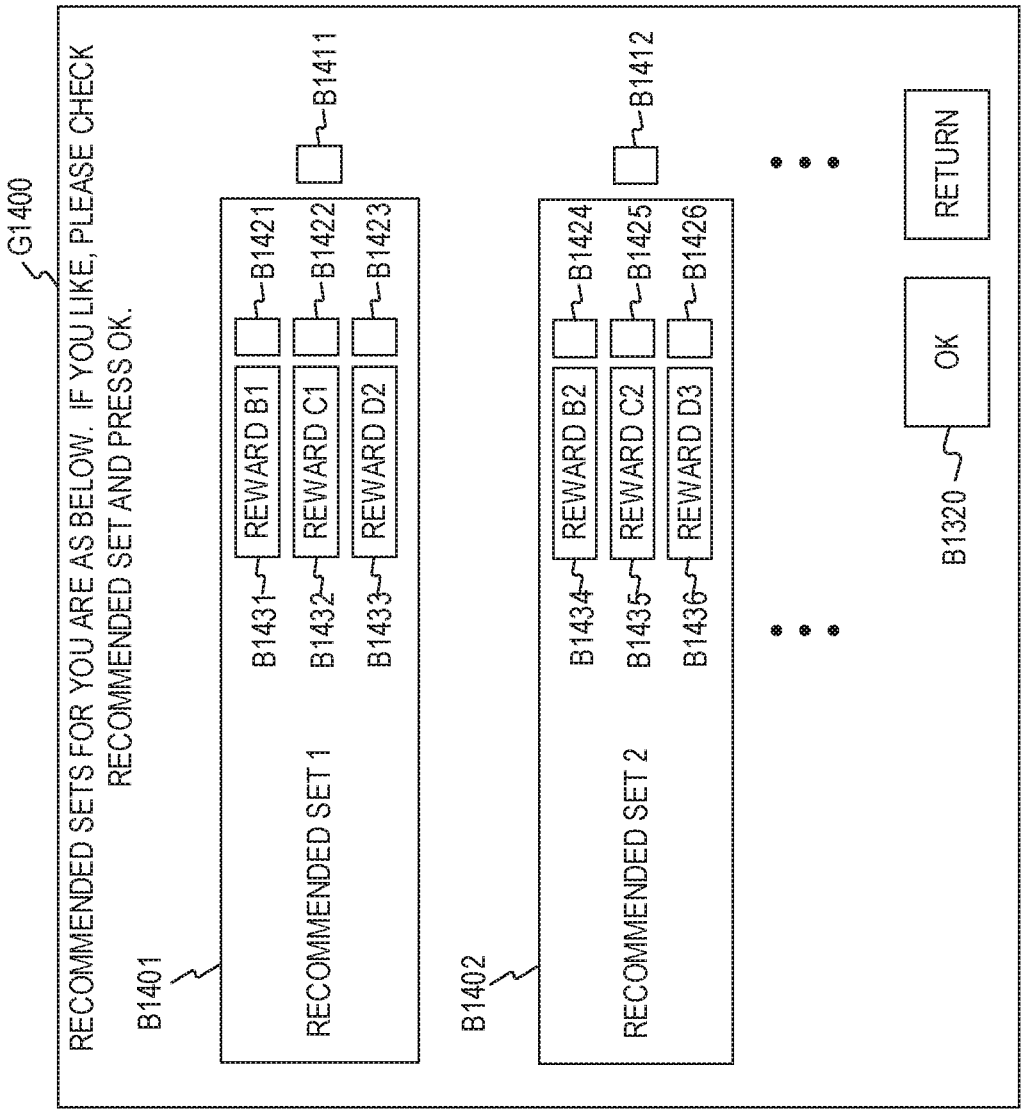
FIG. 14A is an (first) explanatory diagram of another example of the selection method of the plurality of providable rewards in the regular purchase service.
Figure 14B:
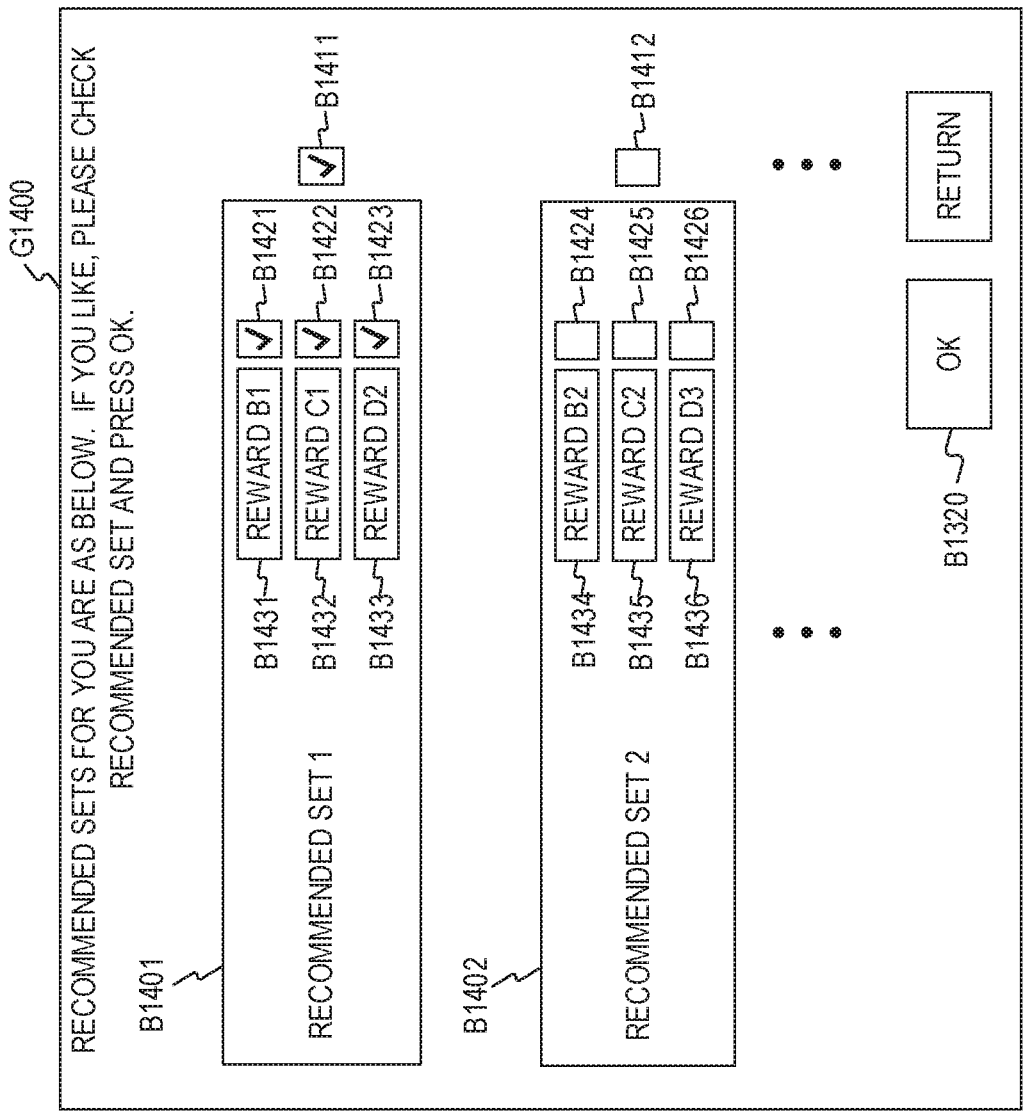
FIG. 14B is an (second) explanatory diagram of another example of the selection method of the plurality of providable rewards in the regular purchase service.

FIG. 11 is a functional block diagram of a function relevant to the regular purchase related function in various functions that are attained by the terminal device 20. FIG. 12 is an explanatory diagram of an example of a selection method of the plurality of providable rewards in the regular purchase service, and is a diagram illustrating an example of the selection screen. FIG. 13 is an explanatory diagram of another example of the selection method of the plurality of providable rewards in the regular purchase service, and is a diagram illustrating another example of the selection screen. FIG. 14A and FIG. 14B are explanatory diagrams of another example of the selection method of the plurality of providable rewards in the regular purchase service, and are diagrams illustrating another example of the selection screen. In the description relevant to FIG. 11, the user indicates the user of the terminal device 20.

As illustrated in FIG. 11, the terminal device 20 includes a selector outputter 210, a selection generator 212, and a selection transmitter 214. The selector outputter 210 and the selection result generation unit 212, for example, can be attained by the terminal control unit 25 illustrated in FIG. 1. In addition, the selection transmitter 214, for example, can be attained by the terminal communication unit 21 and the terminal control unit 25 illustrated in FIG. 1. Note that, a part or all of the functions of the selector outputter 210 and/or the selection generator 212 may be attained by the server device 10. Selector outputter 210 may include a selection screen output unit. Selection generator 212 may include a selection result generation unit. Selection transmitter 214 may include a selection information transmission unit.

The selector outputter 210 outputs the selection screen for supporting the selection of a desired reward by the user. For example, in a case where the user manipulates a regular purchase button (or a selection change button of the reward of the regular purchase) (not illustrated) in the site A on the terminal device 20, the selector outputter 210 outputs the selection screen. The selection screen is arbitrary insofar as it is possible to select arbitrary one or more combinations in the plurality of providable rewards in the regular purchase service.

In the example illustrated in FIG. 12, a selection screen G1200 includes checkboxes B1211, B1212, B1213, . . . for enabling all of the plurality of providable rewards in the regular purchase service to be selected, and the checkboxes B1211, B1212, B1213, . . . are provided in the vicinity of reward buttons B1201, B1202, B1203, . . . representing the corresponding reward. Note that, in the reward buttons B1201, B1202, B1203, . . . , the name of the reward, the number of points necessary for using the reward, or the like may be drawn. Note that, the number of points necessary for using the reward is matched to the number-of-points information in the number-of-points DB 32 illustrated in FIG. 3. In a case where the reward buttons B1201, B1202, B1203, . . . are manipulated, the screen may be transitioned to an explanation screen of the reward. In this case, an explanation based on the reward information in the reward DB 33 may be described on the explanation screen. As described above, the user is capable of easily selecting a desired reward by inputting a check mark in each of the checkboxes associated with each of the reward buttons corresponding to a combination of desired rewards.

Note that, the selection screen G1200 may be a scrollable screen. In addition, in a case where the number of the plurality of providable rewards in the regular purchase service is large, a plurality of selection screens G1200 may be prepared for each category.

In addition, in the example illustrated in FIG. 12, the selection screen G1200 includes an image portion G1230 representing a reward that is currently selected, and an image portion G1240 displaying the total number of points associated with the use of the reward that is currently selected. In addition, the selection screen G1200 includes a confirmation button B1220. The user selects the combination of the desired rewards, and then, manipulates the confirmation button B1220, and thus, is capable of ending the selection operation of the reward.

Note that, the selector outputter 210 may set only a checkbox that is selectable in the checkboxes B1211, B1212, B1213, . . . to be in an active state (a state in which the check mark can be input) such that the total number of points associated with the use of the reward that is currently selected is not greater than the predetermined point. For example, in the example illustrated in FIG. 12, the total number of points associated with the use of the reward that is currently selected is "40". At this time, in a case where the predetermined point is "50", the selector outputter 210 may set only the checkbox according to the reward the number of associated points is less than or equal to "10" to be in the active state (the state in which the check mark can be input). Note that, in this case, the selector outputter 210 determines whether or not the total points of the selected reward is less than or equal to the predetermined point, in cooperation with the determiner 38 of the server device 10.

Note that, in the example illustrated in FIG. 12, the check mark is not input in the checkboxes B1211, B1212, B1213, . . . , in the initial state, but as with the example illustrated in FIG. 13, the check mark may be input in a checkbox corresponding to a recommended set, as a default. In this case, for example, the user may manipulate a button (not illustrated) such as "enabling selection in a recommended default", and thus, as with the example illustrated in FIG. 13, the check mark may be input in the checkbox corresponding to the recommended set. In such a case, it is possible to present various recommended rewards based on the notification of the notifier 54 described above, for each user, and thus, to attain the user interface (UI) in which the desired reward is easily selected by the user.

In the example illustrated in FIG. 13, a selection screen G1300 is generated based on one or more combinations that are notified by the notifier 54 described above, in a mode in which the one or more combinations are easily selected by the user. Specifically, the selection screen G1300 includes checkboxes B1311, B1312, . . . for enabling a plurality of recommended sets to be selected, and the checkboxes B1311, B1312, . . . are provided in the vicinity of "recommended set buttons" B1301, B1302, . . . representing the corresponding recommended set. At least one of the plurality of recommended sets corresponds to the reward of one or more combination that are notified by the notifier 54 described above. Note that, in FIG. 13, there may be a plurality of recommended sets, or there may be only one recommended set. In the "recommended set buttons" B1301, B1302, . . . , the name of each of one or more rewards configuring the recommended set, or the like may be drawn. Note that, in a case where the "recommended set buttons" B1301, B1302, . . . are manipulated, the screen may be transitioned to an explanation screen of each of one or more rewards configuring the recommended set. As described above, in a case where there is a recommended set corresponding to the combination of the desired rewards, the user inputs the check mark in a checkbox associated with the recommended set, and thus, is capable of easily selecting the desired reward. As described above, it is possible to present various recommended rewards based on the notification of the notifier 54 described above, for each user, and thus, to attain the user interface (UI) in which the desired reward is easily selected by the user.

In addition, in the example illustrated in FIG. 13, the selection screen G1300 includes an OK button B1320. The user selects a desired recommended set, and then, manipulates the OK button B1320, thus, is capable of ending the selection operation of the reward.

Note that, the selection screen G1300 may be attained in combination with the selection screen G1200. For example, as illustrated in FIG. 13, the selection screen G1300 includes the OK button B1320, and in a case where the user manipulates the OK button B1320, the selector outputter 210 allows the screen to be transitioned to the selection screen G1200 from the selection screen G1300. In this case, the selection screen G1200 may be output in a state in which the check mark is input in each of the checkboxes associated with each of the rewards configuring the recommended set checked on the selection screen G1300. In this case, the user finally checks the contents of the image portion G1230, or the like on the selection screen G1200, and then, manipulates the confirmation button B1220 in a case where there is no problem, and thus, is capable of a ending the selection operation.

In the example illustrated in FIG. 14A and FIG. 14B, there are buttons B1411, B1412, . . . for collectively checking the recommended set, and it is possible to check checkboxes B1421, B1422, B1423, . . . corresponding to each of the rewards in recommended set buttons B1401, B1402, . . . . In this case, the user is capable of selecting the button of a desired recommended set from buttons B1400, B1401, . . . , and then, of switching a part of each of the rewards in the recommended set according to the selected button. Specifically, for example, in a case where the user selects the button of a reward desired to be switched, in buttons B1431, B1432, and B1433 representing rewards in a "recommended set 1", the screen is transitioned to a reward selection screen (not illustrated), and the desired reward can be selected. In the example illustrated in FIG. 14A and FIG. 14B, the user selects the button B1411 corresponding to the "recommended set 1" illustrated in FIG. 14A, and then, changes the "reward B1" to the "reward B2" in the "recommended set 1". As described above, it is possible to attain the user interface (UI) in which labor-saving of the user is attained while enabling flexible selection of the reward.

Note that, in the example illustrated in FIG. 14A and FIG. 14B, the check mark is not input in the buttons B1411, B1412, . . . , in the initial state, but the check mark may be input in a checkbox corresponding to a recommended set that is most recommended, as a default. In addition, in a case where any of the buttons B1411, B1412, . . . is selected, the check mark may be automatically input in buttons representing the rewards in the selected recommended set (the buttons B1431, B1432, B1433, and the like).

The selection generator 212 generates a selection result of the reward by the user, based on the manipulation input of the user with respect to the selection screen. For example, in the example illustrated in FIG. 12, a combination of rewards in which a check mark when the confirmation button B1220 is manipulated is input is generated as the selection result.

The selection transmitter 214 transmits selection information including the selection result that is generated by the selection generator 212 to the server device 10. In this case, the selection transmitter 214 may transmit the selection information in which the user ID of the site A is associated with the selection result that is generated by the selection generator 212 to the server device 10 (the selection retriever 37), as a change instruction. As described above, the selection information that is transmitted from the terminal device 20 is retrieved by the selection retriever 37 of the server device 10. Note that, the selection information that is generated based on the selection screen G1200 or G1300 illustrated in FIG. 12 or FIG. 13 is the "selection information not required to be reselected" described above.

According to this embodiment described above, in particular, the following advantageous effects may be obtained.

First, according to this embodiment, the predetermined point according to the type of regular purchase contract is applied to the contractual user for each predetermined period $\Delta T1$. Then, the contractual user is capable of using the combination of the desired rewards by selecting the combination from the plurality of providable rewards in the regular purchase service, in the range in which the total points of the selected reward is not greater than the predetermined point.

Accordingly, according to this embodiment, it is possible to diversify the combination of the rewards that are available in the regular purchase contract, without excessively diversifying the type of regular purchase contract. Specifically, in a comparative example in which the type of regular purchase contract is set for the number of possible combinations of various rewards, the type of regular purchase contract is excessively diversified, and the processing load according to the regular purchase contract increases. In contrast, according to this embodiment, it is possible to diversify the combination of the rewards that are available in the regular purchase contract while setting a smaller number of types of regular purchase contracts, without setting the type of regular purchase contract for the number of possible combination of various rewards.

In addition, according to this embodiment, the selection updater 44 updates the selection information in the selection DB 34 in accordance with the change instruction of the selection information from the contractual user, as described above. Accordingly, according to this embodiment, the user is capable of changing the selection information afterwards without changing the type of regular purchase contract.

As described above, according to this embodiment, it is possible to increase the convenience of the contractual user while reducing the processing load according to the regular purchase contract.

In addition, according to this embodiment, the selection updater 44 executes the automatic update processing (the rewriting of the selection information) in accordance with a specific change in the providable reward in the regular purchase service, as described above, and thus, even in a case where there is the specific change in the providable reward in the regular purchase service, it is possible for the contractual user to maintain a state in which an equivalent reward can be used without performing a special procedure. Accordingly, compared to a case where a notice for a change in the selection information, or the like is output to the contractual user, in accordance with the specific change in the providable reward in the regular purchase service, it is possible to efficiently reduce the processing load in the server device 10.

In addition, according to this embodiment, in a case where the automatic update processing (the rewriting of the selection information) is executed by the selection updater 44, the informer 46 informs the corresponding contractual user of the information relevant to the rewriting. Accordingly, it is possible to suitably transmit the contents of the automatic update processing to the contractual user while increasing the convenience of the contractual user. In addition, it is possible to attain efficient informing operation and to efficiently reduce the processing load in the server device 10, compared to a case where the specific change in the providable reward in the regular purchase service is informed to all of the contractual users. Note that, it is expected that the number of contractual users who do not want the rewriting of the selection information due to such a change is small, but according to this embodiment, such contractual users receive such informing, and are capable of changing the selection information, and thus, it is possible to minimize adverse effects due to the automatic update processing (the rewriting of the selection information).

In addition, according to this embodiment, the charger 48 is provided, and thus, it is possible to make the charging service and the regular purchase service compatible. In this case, a predetermined providable reward in the charging service and a providable reward in the regular purchase service are at least partially different from each other, and thus, it is possible to suitably compartmentalize such rewards. In addition, in this case, the providable reward in the regular purchase service is set to be more advantageous than the predetermined providable reward in the charging service, and thus, it is possible to impart an effective motivation for performing the regular purchase contract to a user other than the contractual user.

In addition, according to this embodiment, the notifier 54 notifies one or more selectable combinations in the range in which the total points of the selected reward is not greater than the predetermined point, in various combinations of the plurality of providable rewards in the regular purchase service, to the user. Accordingly, even in a case where the providable reward in the regular purchase service is diversified, the reward is easily selected by the contractual user in the range in which the total points of the selected reward is not greater than the predetermined point, and thus, it is possible to increase the convenience of the contractual user.

In addition, according to this embodiment, the candidate selector 52 is provided, and thus, it is possible for the notifier 54 to notify various combinations of the rewards according to the preference of the user, the progression situation of the game by the user, the manipulation tendency of the user, or the like, for each user. Accordingly, even in a case where the providable reward in the regular purchase service is diversified, a desired reward is easily selected by the contractual user, and thus, it is possible to increase the convenience of the contractual user.

Next, various operation examples in a case where the plurality of providable rewards in the regular purchase service are set in each of a plurality of digital contents will be described with reference to FIG. 15 and the like.

FIG. 15 is an explanatory diagram of the premise of one operation example, and is a diagram illustrating an example of a relationship in a plurality of digital contents, a reward set in each of the digital contents, and a server computer that manages each of the digital contents.

In FIG. 15, a "game application GA" that is the digital content is set with 51 rewards of rewards A0 to A50, and is managed by a server computer SA. In addition, similarly, a "game application GB" that is the digital content is set with 41 rewards of rewards B0 to B40, and is managed by a server computer SB. In addition, similarly, "digital books DD0 to DD5" that are an aggregation of six digital contents are set with six rewards of rewards C0 to C5, and are managed by a server computer SC. In some embodiments, server computer SA may include server computer SB and/or server computer SC. Hereinafter, similarly, one or more rewards may be set in the other digital content. Note that, a digital content set with one or more rewards may be a part or all of various applications that are provided by the server device 10.

Figure 16:
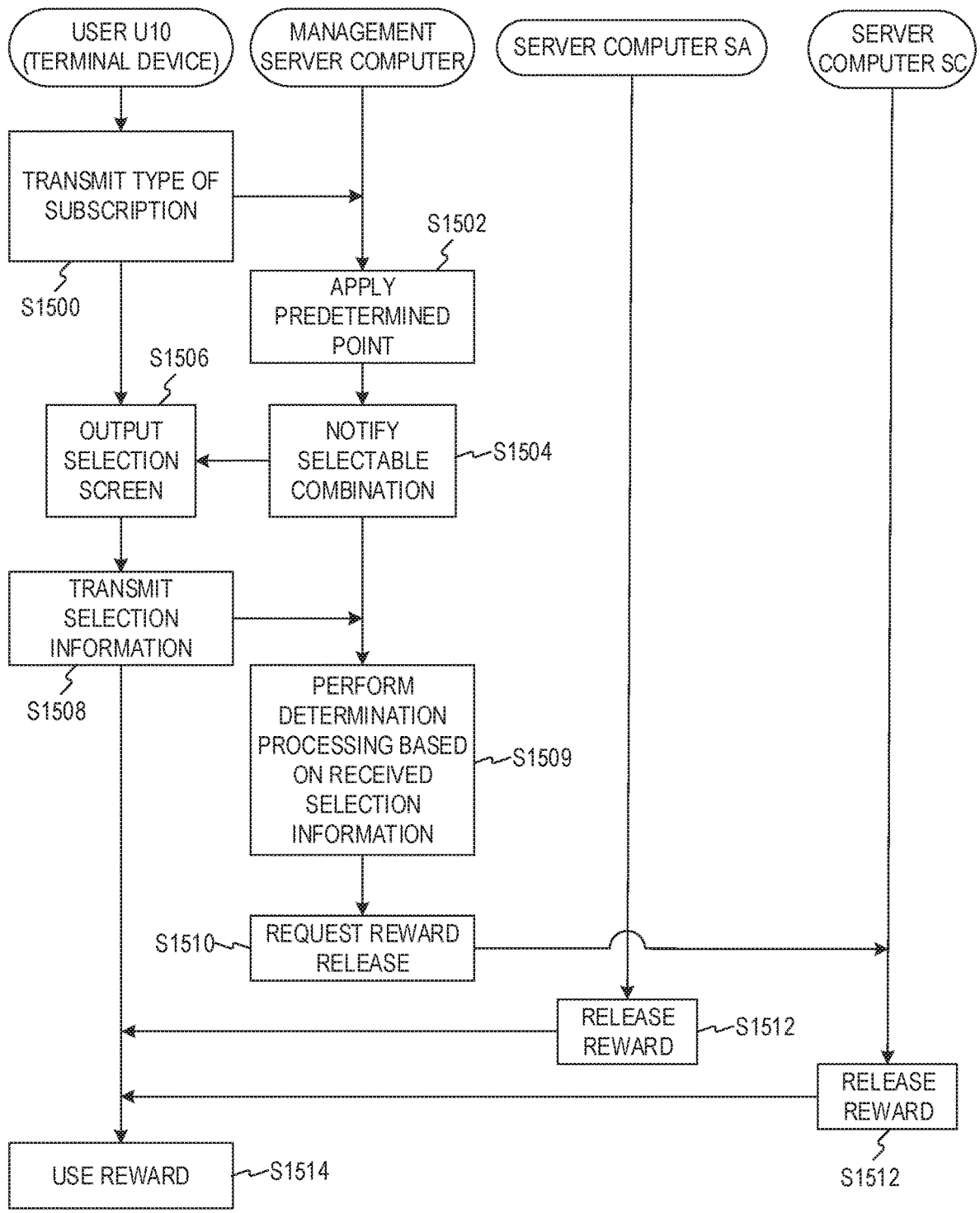
FIG. 16 is a schematic view of a flow of one operation example.

FIG. 16 is an explanatory diagram of this operation example, and is an explanatory diagram schematically illustrating a flow of an operation until a new user U10 who wants the regular purchase service performs the regular purchase contract such that a desired reward can be used, under the premise illustrated in FIG. 15. Note that, various server computers (a management server computer, the server computer SC, and the server computer SA) illustrated in FIG. 16 configure the server device 10 illustrated in FIG. 1. Note that, in FIG. 16 (the same applies to other flowcharts described below), a processing order of each step may be switched, unless a relationship between input and output in each step is impaired.

In step S1500, the user U10 transmits the type of regular purchase contract to the management server computer from the terminal device 20, in accordance with the regular purchase contract.

In step S1502, the management server computer associates the predetermined point according to the type of regular purchase contract that is received, with a user ID according to the user U10. Note that, such processing can be attained by the point applier 36 described above.

In step S1504, the management server computer notifies a combination of rewards that are available using the predetermined associated point to the terminal device 20 according to the user U10. At this time, the management server computer may include the candidate selector 52 and the notifier 54 described above, and in this case, a combination selected based on the preference information, in the user information according to the user U10, is notified to the user U10.

In step S1506, the user U10 displays the notification from the management server computer (the combination of the rewards that are available using the predetermined point) on the display unit 23 of the terminal device 20. In this case, the terminal device 20 may output the selection screen as illustrated in FIG. 12 to FIG. 14A.

In step S1508, the user U10 performs the selection operation on the terminal device 20, and transmits the selection information to the management server computer from the terminal device 20. Here, selection information including the reward A0, the reward B0, and the reward C0 as the selection target is transmitted to the management server computer.

In step S1509, the management server computer determines whether or not the total points of the selected reward is less than or equal to the predetermined point, based on the received selection information. Note that, such processing (the determination processing) can be attained by the determiner 38 described above. In FIG. 16, in a case where the received selection information corresponds to the combination of the rewards notified in step S1504, the management server computer may determine that the total points of the selected reward is less than or equal to the predetermined point. Note that, in a case where it is determined that the total points of the selected reward is not less than or equal to the predetermined point, the management server computer may transmit a reselection request to the terminal device 20.

In step S1510, the management server computer transmits a reward release request to the corresponding server computer, based on a fact that a determination result in step S1509 is positive (that is, it is determined that the total points of the selected reward is less than or equal to the predetermined point), and based on the selection information according to the user U10 in the selection DB 34. Note that, such processing can be attained by the reward manager 40 described above. In FIG. 16, the management server computer transmits the reward release request for enabling the use of the reward A0 and the reward B0, based on the user ID according to the user U10, to the server computer SA managing the reward A0 and the reward B0 and transmits the reward release request for enabling the use of the reward C0, based on the user ID according to the user U10, to the server computer SC managing the reward C0, based on the selection information including the reward A0, the reward B0, and the reward C0 as the selection target.

In step S1512, the corresponding one or more server computers release (enable) the corresponding reward, in accordance with reward release request. Note that, such processing can be attained by the reward manager 40 described above. In FIG. 16, the server computer SA enables the use of the reward A0 and the reward B0, based on the user ID according to the user U10, and the server computer SC enables the use of the reward C0, based on the user ID according to the user U10.

In step S1514, the user U10 suitably uses the reward A0, the reward B0, and the reward C0 on the terminal device 20.

FIG. 17 is an explanatory diagram of the premise of another operation example, and is a table indicating an example of a relationship in one digital content, a reward set in the one digital content, and a server computer that manages one digital content. In FIG. 17, unlike the premise illustrated in FIG. 15, the providable reward in the regular purchase service is limited to a reward relevant to one specific digital content.

Figure 18:
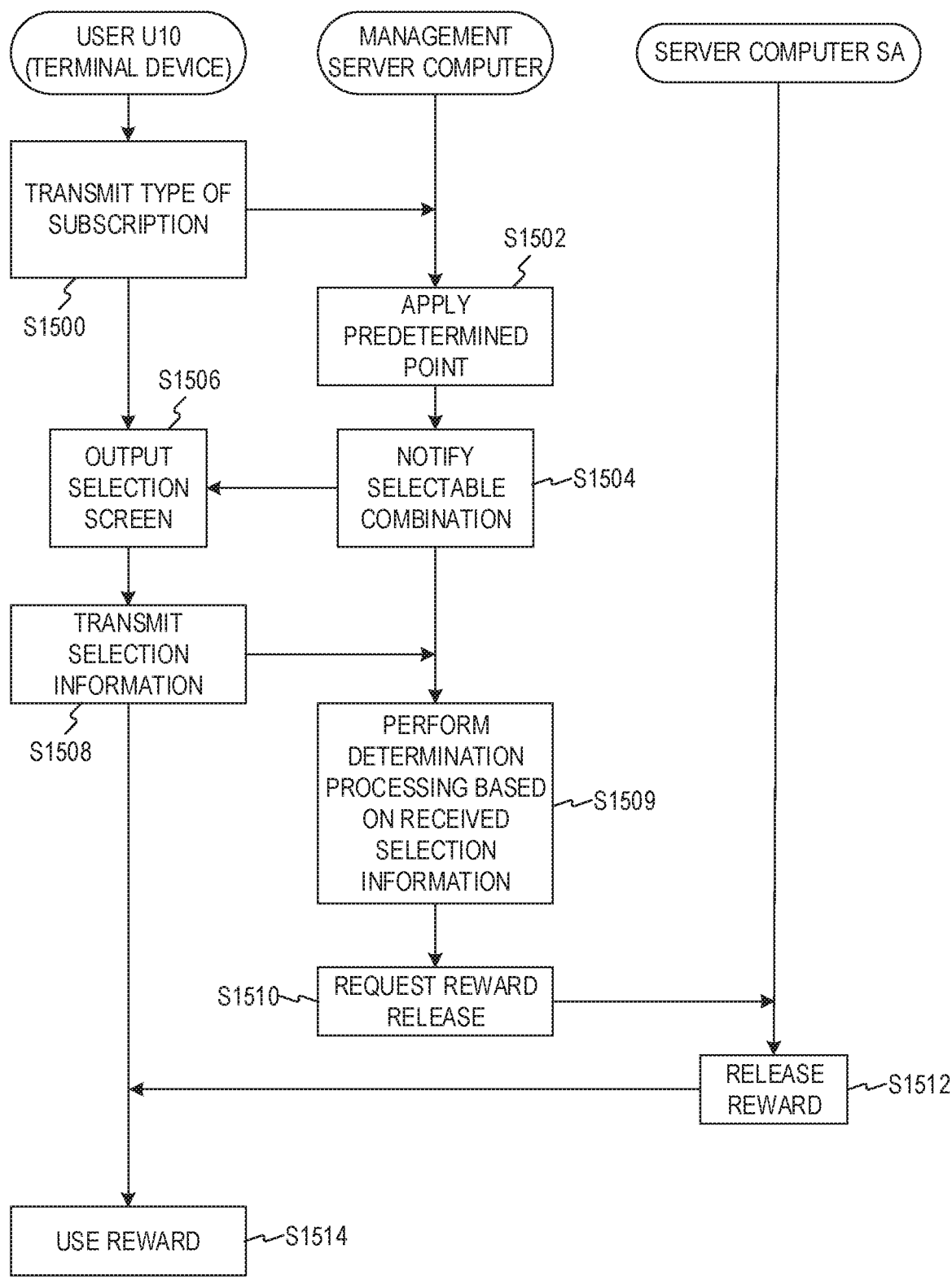
FIG. 18 is a schematic view of a flow of another operation example.

FIG. 18 is an explanatory diagram of another operation example, and is an explanatory diagram schematically illustrating a flow of an operation until the new user U10 who wants the regular purchase service performs the regular purchase contract such that a desired reward can be used, under the premise illustrated in FIG. 17. Note that, in FIG. 18, the description may be omitted by applying the same step number to processing that may be substantially identical to that of FIG. 16.

In the example illustrated in FIG. 18, unlike the example illustrated in FIG. 16, in step S1508, selection information including the reward A0 and the reward A1 as the selection target is transmitted to the management server computer. In this case, in step S1510, the management server computer transmits the reward release request for enabling the use of the reward A0 and the reward A1, based on the user ID according to the user U10 to the server computer SA managing the reward A0 and the reward A1, based on the selection information including the reward A0 and the reward A1 as the selection target. Note that, such processing can be attained by the reward manager 40 described above.

Note that, in FIG. 16 and FIG. 18, a case where the user U10 newly performs the regular purchase contract has been described, but the same applies to a case where the type of regular purchase contract is changed.

Figure 19:
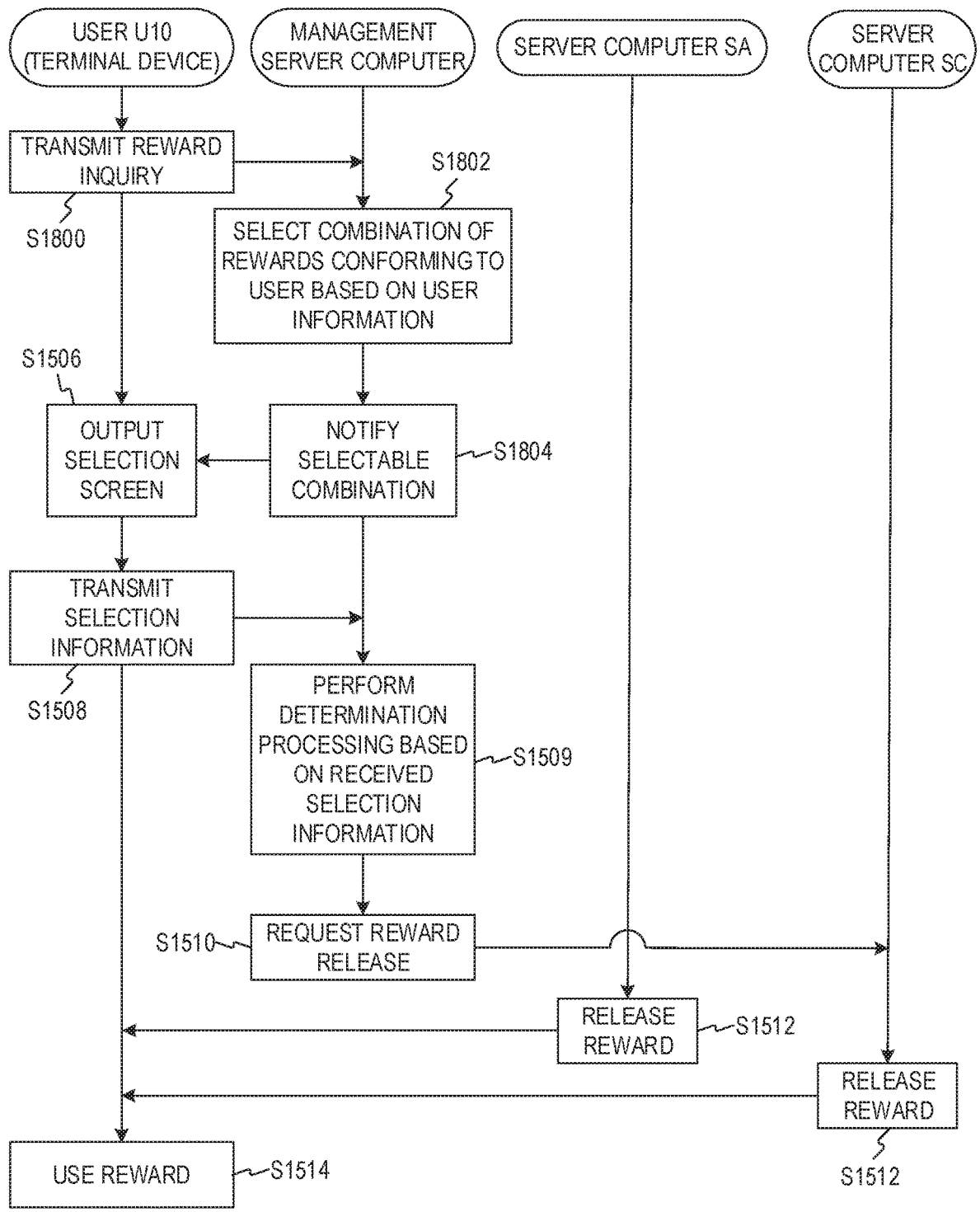
FIG. 19 is a schematic view of a flow of still another operation example.

FIG. 19 is an explanatory diagram schematically illustrating a flow of an operation until the user U10 changes a reward according to the regular purchase contract such that a new desired reward can be used, under the premise illustrated in FIG. 15. Note that, in FIG. 19, the description may be omitted by applying the same step number to processing that may be substantially identical to that of FIG. 16.

In step S1800, the user U10 wants to change the reward that is selected (the reward according to the regular purchase contract), and transmits a reward inquiry to the management server computer from the terminal device 20.

In step S1802, the management server computer selects (derives) a combination of rewards conforming to the user U10, based on the user information according to the user U10. Note that, such processing can be attained by the candidate selector 52 described above. In this case, in step S1504, the management server computer notifies the combination of the rewards selected in step S1802 to the terminal device 20. Note that, in the modification example, the management server computer may generate a list of the rewards, based on the reward information in the reward DB 33, and may notify the generated list of the rewards to the terminal device 20.

Then, in this case, in a case where the user U10 changes the reward according to the regular purchase contract, in step S1508, new selection information is transmitted to the management server computer, and the management server computer executes the same processing based on the new selection information.

Note that, FIG. 19 relates to the flow of the operation under the premise illustrated in FIG. 15, and the same applies to the flow of the operation under the premise illustrated in FIG. 17.

Figure 20:
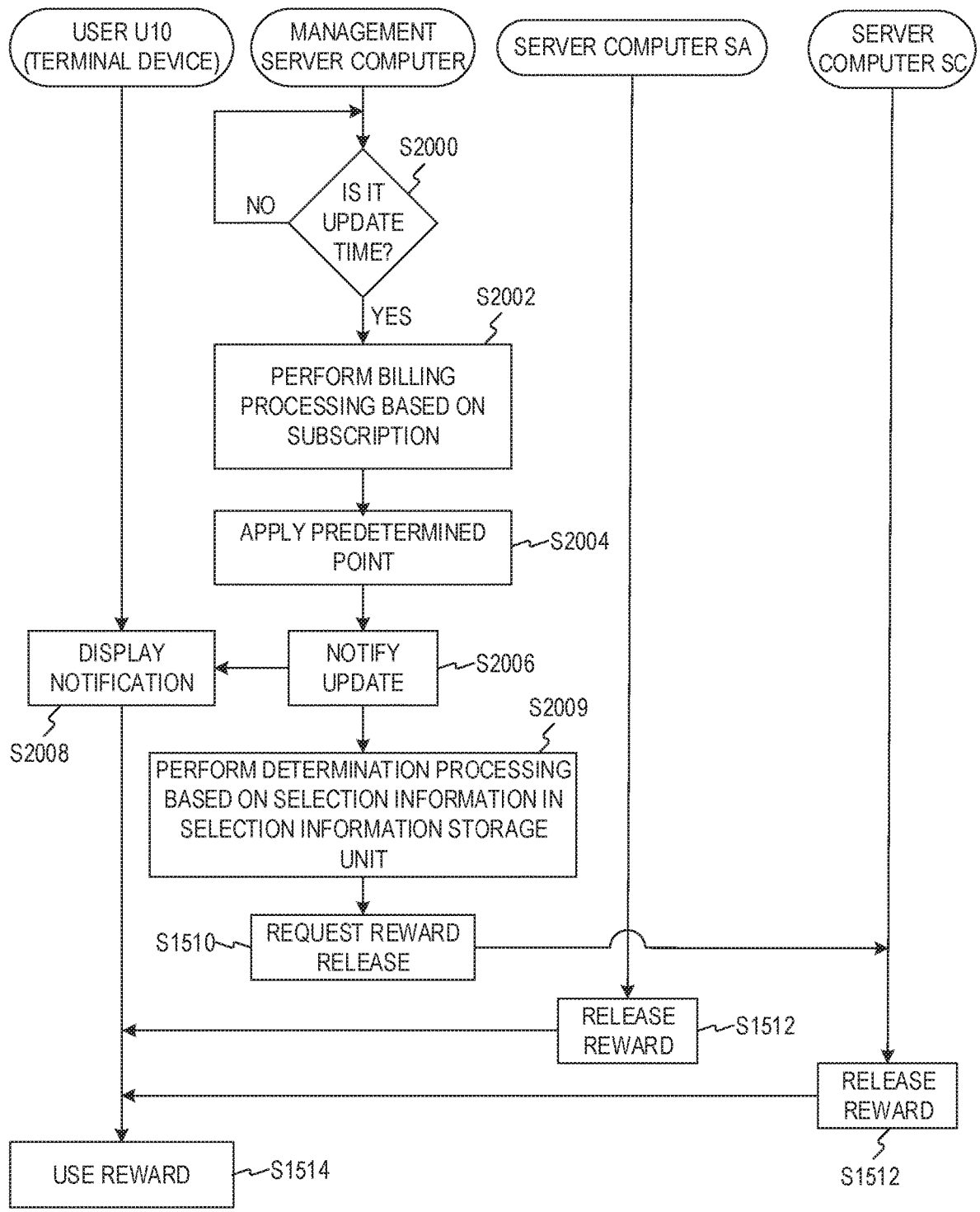
FIG. 20 is a schematic view of a flow of still another operation example.

FIG. 20 is an explanatory diagram schematically illustrating a flow of an update operation in a case where the user U10 maintains the regular purchase contract for longer than the predetermined period ΔT1, under the premise illustrated in FIG. 15. Note that, in FIG. 20, the description may be omitted by applying the same step number to processing that may be substantially identical to that of FIG. 16.

In step S2000, the management server computer determines whether or not it is an update time according to the user U10. In this embodiment, as described above, the beginning of month is the update time, and thus, the management server computer determines whether or not it is the beginning of month. In a case where it is the update time, the processing proceeds to step S2002.

In step S2002, the management server computer performs billing processing based on the regular purchase contract according to the user U10. Note that, such processing can be attained by the biller 35 described above.

In step S2004, the management server computer associates the predetermined point according to the type of regular purchase contract according to the user U10 (the same as that of the previous update time unless there is a change) with the user ID according to the user U10. Note that, such processing can be attained by the point applier 36 described above.

In step S2006, the management server computer transmits a notification that the regular purchase contract is maintained for the further predetermined period ΔT1 to the terminal device 20 according to the user U10. Note that, in this case, the notification may include information representing a reward that is currently selected (that is, the selection information).

In step S2008, the user U10 displays the notification from the management server computer (the notification that the regular purchase contract is maintained for the further predetermined period ΔT1) on the display unit 23 of the terminal device 20. Note that, in this case, the user U10, as necessary, may change the reward according to the regular purchase contract, as illustrated in FIG. 19.

In step S2009, the management server computer determines whether or not the total points of the selected reward is less than or equal to the predetermined point, based on the selection information according to the user U10 in the selection DB 34. Note that, such processing (the determination processing) can be attained by the determiner 38 described above. In FIG. 20, the selection information according to the user U10 is not changed in accordance with the update, and thus, step S2009 may be omitted.

Note that, in FIG. 20, even though it is not described, the management server computer may transmit a notification that it is the update time to the terminal device 20 according to the user U10 before the update time according to the user U10 (for example, one week before the transmission). In this case, the user U10, as necessary, easily changes the reward according to the regular purchase contract, in accordance with the current update timing, as illustrated in FIG. 19.

Figure 21:
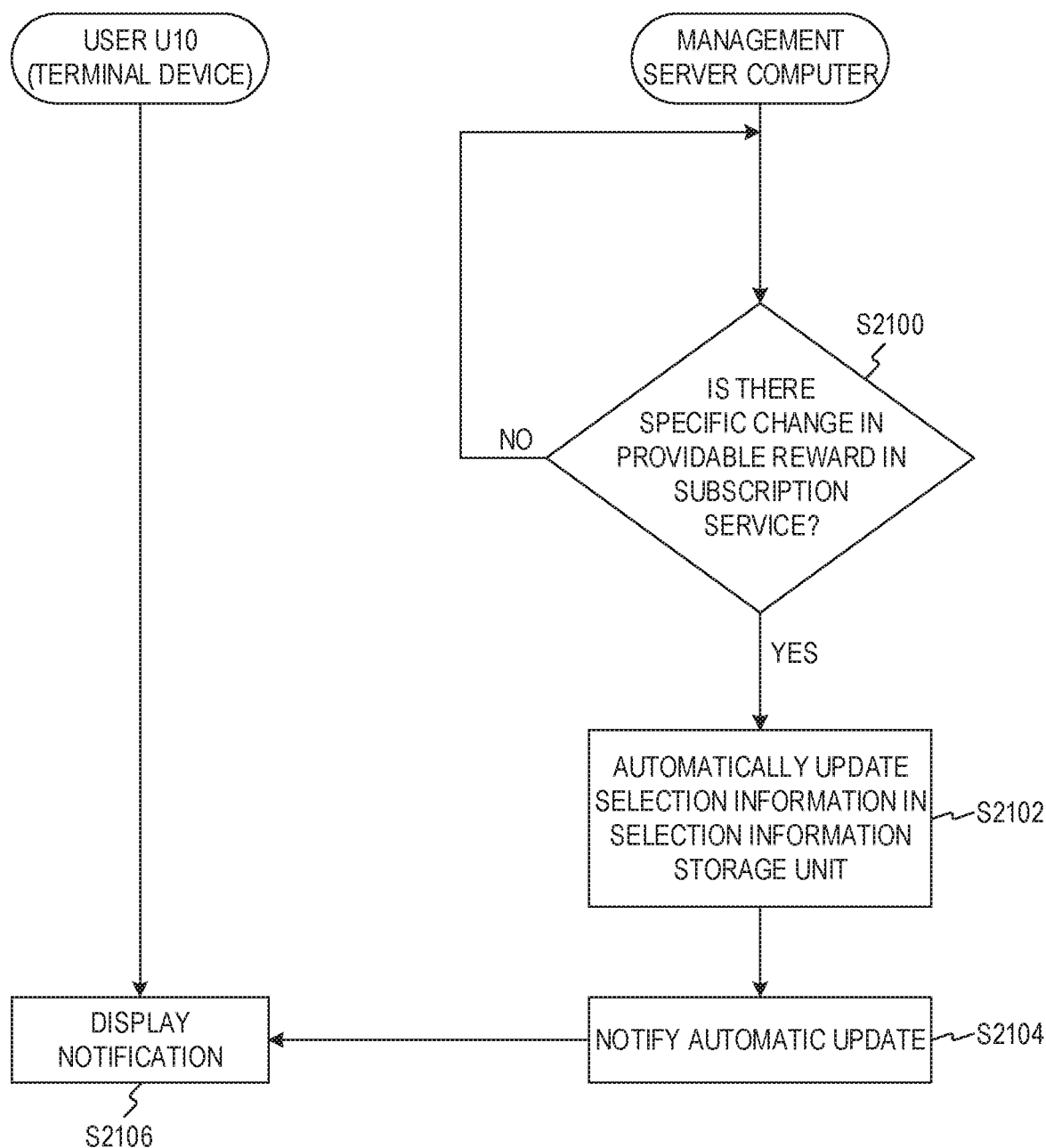
FIG. 21 is a schematic view of a flow of still another operation example.

FIG. 21 is an explanatory diagram schematically illustrating a flow of an operation in a case where there is a specific change in the providable reward in the regular purchase service.

In step S2100, the management server computer determines whether or not there is the specific change in the providable reward in the regular purchase service. The specific change is as described above. In a case where there is the specific change, the processing proceeds to step S2102.

In step S2102, the management server computer automatically updates the selection information in the selection DB 34, in accordance with the specific change. Note that, such processing (the automatic update processing) can be attained by the selection updater 44 described above. Note that, in FIG. 21, the user U10 selects a reward relevant to the specific change. In this case, the selection information according to the user U10 in the selection DB 34 is automatically updated.

In step S2104, the management server computer transmits a notification that the selection information is automatically updated to the terminal device 20 according to the user U10. Note that, in this case, the notification may include information representing a reward that is currently selected (a reward after automatic update) (that is, the selection information).

In step S2106, the user U10 displays the notification from the management server computer (the notification that the selection information is automatically updated) on the display unit 23 of the terminal device 20. Note that, in this case, the user U10, as necessary, may change the reward according to the regular purchase contract, as illustrated in FIG. 19.

Note that, in FIG. 21, even though it is not described, the management server computer transmits the reward release request for enabling the use based on the user ID according to the user U10 to the corresponding server computer, at a suitable timing, based on the selection information according to the user U10 in the selection DB 34 (selection information after the automatic update processing).

In addition, in FIG. 21, even though it is not described, the management server computer may determine whether or not the total points of the selected reward is less than or equal to the predetermined point, after the automatic update processing, based on the selection information according to the user U10 in the selection DB 34 (the selection information after the automatic update processing). Note that, such processing (the determination processing) can be attained by the determiner 38 described above. Note that, in a case where the number of points corresponding to the rewards before and after being changed in the automatic update processing is not changed, such determination processing may be omitted.

Each of the embodiments has been described above, but the present invention is not limited to a specific embodiment, and various modifications and changes can be made within the scope of the claims. In addition, it is also possible to combine all or a plurality of the constituents of the embodiments described above.

For example, in the embodiments described above, at least a part of the screen displayed on the terminal device 20 (a game screen or the selection screen as illustrated in FIG. 12 or FIG. 13) may be set to web display that is displayed on the terminal device 20 based on data generated by the server device 10, or at least a part of the screen may be set to native display that is displayed by a native application installed in the terminal device 20.

Note that, the following appendices will be further disclosed with respect to the embodiments described above.

[Appendix 1]

A device including:

a point applying unit that associates a predetermined point according to a type of regular purchase contract with user identification information according to a contractual user who has performed the regular purchase contract, for each predetermined period according to the regular purchase contract;

a number-of-points information storage unit that stores number-of-points information representing the number of points associated with use of a reward, for each reward, in a plurality of providable rewards;

a selection information acquisition unit that retrieves selection information that is associated with the user identification information and represents one or more selected rewards of the plurality of rewards;

a determination unit that determines whether or not the total number of points that are set by the selection information retrieved by the selection information acquisition unit and the number-of-points information in the number-of-points information storage unit and are associated with the one or more selected rewards has a predetermined relationship with the predetermined point associated by the point applying unit; and a reward management unit that enables the one or more selected rewards to be used, based on the user identification information, in a case where it is determined that there is the predetermined relationship by the determination unit.

[Appendix 2]

The device according to Appendix 1, further including:

a point parameter storage unit that stores parameter information representing a point parameter for each type of regular purchase contract, in which the point applying unit determines the predetermined point based on the point parameter associated with the type of regular purchase contract by the contractual user, with reference to the parameter information in the point parameter storage unit.

[Appendix 3]

The device according to Appendix 1 or 2, in which the number of types of regular purchase contracts is less than the number of plurality of rewards.

[Appendix 4]

The device according to any one of Appendices 1 to 3, further including: an information update unit updating the number-of-points information in the number-of-points information storage unit, based on a new reward that is added as one of the plurality of rewards or an unavailable reward of the plurality of rewards.

[Appendix 5]

The device according to any one of Appendices 1 to 4, in which the plurality of rewards include a first reward that is unavailable from a certain timing, and a second reward that is available in accordance with the timing and is relevant to the first reward, the device further includes:

a selection information storage unit that stores the selection information retrieved by the selection information acquisition unit; and a selection information update unit that executes rewriting for changing a selection target to the second reward from the first reward, with respect to the selection information including the first reward as the selection target, in the selection information storage unit.

[Appendix 6]

The device according to Appendix 5, further including: an informing unit that informs an informing destination associated with the user identification information of information relevant to the rewriting, based on the user identification information associated with the selection information in which the rewriting is executed, in a case where the rewriting of the selection information is executed by the selection information update unit.

[Appendix 7]

The device according to any one of Appendices 1 to 6, further including:

a charging unit that allows a predetermined reward to be used by charging, in which the plurality of rewards include a reward different from the predetermined reward.

[Appendix 8]

The device according to any one of Appendices 1 to 7, in which the determination unit determines whether or not there is a relationship in which the total number of points is less than or equal to the predetermined point, as the predetermined relationship.

[Appendix 9]

The device according to Appendix 8, further including: a notification unit that notifies one or more combinations that are selectable in a range in which the total number of points is not greater than the predetermined point, in each combination of the plurality of rewards, to the contractual user or a non-contractual user.

[Appendix 10]

The device according to Appendix 9, further including:

a user information storage unit that stores user information relevant to one user of the contractual user and the non-contractual user; and a candidate selection unit that selects one or more combination candidates in the combinations that are selectable in the range in which the total number of points is not greater than the predetermined point, based on the user information, in which the notification unit notifies the combination candidate selected by the candidate selection unit to the one user.

[Appendix 11]

The device according to Appendix 10, in which the user information includes information representing preference of the one user or information capable of deriving the preference, and the candidate selection unit selects the one or more combination candidates conforming to the preference of the one user.

[Appendix 12]

The device according to Appendix 10, in which the user information includes log information of the one user, and the candidate selection unit predicts or derives a manipulation capable of being performed in furtherance or a manipulation to be performed next by the one user, based on the log information of the one user, and selects the one or more combination candidates conforming to the predicted or derived manipulation.

[Appendix 13]

The device according to any one of Appendices 1 to 12, in which the plurality of rewards include at least any one of a reward in a physical store, a reward relevant to a specific service providable by a specific site, and a reward relevant to a digital content.

[Appendix 14]

The device according to any one of Appendices 1 to 13, in which the plurality of rewards include one or more rewards that are set in each content of a plurality of digital contents or a plurality of rewards that are set in one specific digital content.

[Appendix 15]

A method to be executed by a computer, the method including:

associating a predetermined point according to a type of regular purchase contract with user identification information according to a contractual user who has performed the regular purchase contract, for each predetermined period according to the regular purchase contract;

allowing a number-of-points information storage unit to store number-of-points information representing the number of points associated with use of a reward, for each reward, in a plurality of providable rewards;

acquiring selection information that is associated with the user identification information and represents one or more selected rewards of the plurality of rewards;

determining whether or not the total number of points that are set by the retrieved selection information and the number-of-points information in the number-of-points information storage unit and are associated with the one or more selected rewards has a predetermined relationship with the predetermined point; and enabling the one or more selected rewards to be used, based on the user identification information, in a case where it is determined that there is the predetermined relationship.

[Appendix 16]

A program for allowing a computer to execute processing for:

associating a predetermined point according to a type of regular purchase contract with user identification information according to a contractual user who has performed the regular purchase contract, for each predetermined period according to the regular purchase contract;

allowing a number-of-points information storage unit to store number-of-points information representing the number of points associated with use of a reward, for each reward, in a plurality of providable rewards;

acquiring selection information that is associated with the user identification information and represents one or more selected rewards of the plurality of rewards;

determining whether or not the total number of points that are set by the retrieved selection information and the number-of-points information in the number-of-points information storage unit and are associated with the one or more selected rewards has a predetermined relationship with the predetermined point; and enabling the one or more selected rewards to be used, based on the user identification information, in a case where it is determined that there is the predetermined relationship.

What is claimed is:

1. A device comprising:
a point applying unit configured to associate a predetermined point according to a type of a regular purchase contract with user identification information according to a contractual user that has performed the regular purchase contract, for each predetermined period according to the regular purchase contract;
a number-of-points information storage unit configured to store number-of-points information representing a number of points associated with use of a reward, for each reward, of a plurality of providable rewards;
a selection information acquisition unit configured to retrieve selection information that is associated with the user identification information and represents one or more selected rewards of the plurality of providable rewards;
a determination unit configured to determine whether or not a predetermined relationship exists between the predetermined point and a total number of points, the total number of points being set by the selection information and the number-of-points information in the number-of-points information storage unit, and the total number of points being associated with the one or more selected rewards;
a reward management unit configured to enable the one or more selected rewards to be used based on the user identification information, in a case where it is determined that the predetermined relationship exists;
a notification unit configured to notify the contractual user or a non-contractual user, via a graphical user interface, of one or more combinations of rewards that are selectable in a range in which the total number of points is not greater than the predetermined point, in each combination of the plurality of providable rewards, wherein the one or more combinations of rewards are selectable by the contractual user or the non-contractual user, and the one or more combinations of rewards include a providable reward in the regular purchase contract;
a user information storage unit configured to store user information relevant to one user among the contractual user and the non-contractual user; and
a candidate selection unit configured to select one or more combination candidates among the one or more combinations that are selectable in a range in which the total number of points is not greater than the predetermined point, based on the user information,
wherein the determination unit is configured to determine whether or not there is a relationship in which the total number of points is less than or equal to the predetermined point, as the predetermined relationship, and
the notification unit is configured to notify the one user of the combination candidate selected by the candidate selection unit.

2. The device according to claim 1, further comprising:
a point parameter storage unit configured to store parameter information representing a point parameter for each type of a plurality of types of regular purchase contract,
wherein the point applying unit determines the predetermined point based on the point parameter associated with the type of regular purchase contract by the contractual user, with reference to the parameter information in the point parameter storage unit.

3. The device according to claim 2, wherein the number of types of regular purchase contracts is less than the number of the plurality of providable rewards.

4. The device according to claim 1, further comprising:
an information update unit configured to update the number-of-points information in the number-of-points information storage unit, based on a new reward that is added as one of the plurality of providable rewards or an unavailable reward of the plurality of providable rewards.

5. The device according to claim 1,
wherein the plurality of providable rewards include a first reward that is unavailable from a certain timing, and a second reward that is available in accordance with the certain timing and is relevant to the first reward,
the device further comprising:
a selection information storage unit configured to store the selection information retrieved by the selection information acquisition unit; and
a selection information update unit configured to perform rewriting for changing a selection target to the second reward from the first reward, with respect to the selection information including the first reward as the selection target, in the selection information storage unit.

6. The device according to claim 5, further comprising:
an informing unit configured to inform an informing destination associated with the user identification information of information relevant to the rewriting, based on the user identification information associated with the selection information in which the rewriting has been performed, in a case where the rewriting of the selection information is performed by the selection information update unit.

7. The device according to claim 1, further comprising:
a charging unit configured to allow a predetermined reward to be used by charging,
wherein the plurality of providable rewards include a reward different from the predetermined reward.

8. The device according to claim 1,
wherein the user information includes information representing preference of the one user or information capable of deriving the preference, and
the candidate selection unit is configured to select the one or more combination candidates conforming to the preference of the one user.

9. The device according to claim 1,
wherein the user information includes log information of the one user, and
the candidate selection unit is configured to predict or derive a manipulation capable of being performed next by the one user, based on the log information of the one user, and select the one or more combination candidates conforming to the predicted or derived manipulation.

10. The device according to claim 1, wherein the plurality of providable rewards include a reward in a physical store, a reward relevant to a specific service providable by a specific site, or a reward relevant to a digital content.

11. The device according to claim 1, wherein the plurality of providable rewards include one or more rewards that are set in each content of a plurality of digital contents or a plurality of providable rewards that are set in one specific digital content.

12. A method to be executed by a computer, the method comprising:
- associating a predetermined point according to a type of a regular purchase contract with user identification information according to a contractual user that has performed the regular purchase contract, for each predetermined period according to the regular purchase contract;
- allowing a number-of-points information storage unit to store number-of-points information representing a number of points associated with use of a reward, for each reward, of a plurality of providable rewards;
- acquiring selection information that is associated with the user identification information and represents one or more selected rewards of the plurality of providable rewards;
- determining whether or not a predetermined relationship exists between the predetermined point and a total number of points, the total number of points being set by the selection information and the number-of-points information in the number-of-points information storage unit, and the total number of points being associated with the one or more selected rewards, the predetermined relationship including whether or not there is a relationship in which the total number of points is less than or equal to the predetermined point;
- enabling the one or more selected rewards to be used, based on the user identification information, in a case where it is determined that the predetermined relationship exists;
- notifying the contractual user or a non-contractual user, via a graphical user interface, of one or more combinations of rewards that are selectable in a range in which the total number of points is not greater than the predetermined point, in each combination of the plurality of providable rewards, wherein the one or more combinations of rewards are selectable by the contractual user or the non-contractual user, and the one or more combinations of rewards include a providable reward in the regular purchase contract;
- storing user information relevant to one user among the contractual user and the non-contractual user;
- selecting one or more combination candidates among the one or more combinations that are selectable in a range in which the total number of points is not greater than the predetermined point, based on the user information; and
- notifying the one user of the combination candidate selected.

13. A non-transitory computer readable medium comprising instructions that, when executed by a processor, cause the processor to:
- associate a predetermined point according to a type of a regular purchase contract with user identification information according to a contractual user that has performed the regular purchase contract, for each predetermined period according to the regular purchase contract;
- allowing a number-of-points information storage unit to store number-of-points information representing a number of points associated with use of a reward, for each reward, of a plurality of providable rewards;
- acquiring selection information that is associated with the user identification information and represents one or more selected rewards of the plurality of providable rewards;
- determining whether or not a predetermined relationship exists between the predetermined point and a total number of points, the total number of points being set by the selection information and the number-of-points information in the number-of-points information storage unit, and the total number of points being associated with the one or more selected rewards, the predetermined relationship including whether or not there is a relationship in which the total number of points is less than or equal to the predetermined point;
- enabling the one or more selected rewards to be used, based on the user identification information, in a case where it is determined that the predetermined relationship exists;
- notify the contractual user or a non-contractual user, via a graphical user interface, of one or more combinations of rewards that are selectable in a range in which the total number of points is not greater than the predetermined point, in each combination of the plurality of providable rewards, wherein the one or more combinations of rewards are selectable by the contractual user or the non-contractual user, and the one or more combinations of rewards include a providable reward in the regular purchase contract;
- store user information relevant to one user among the contractual user and the non-contractual user;
- select one or more combination candidates among the one or more combinations that are selectable in a range in which the total number of points is not greater than the predetermined point, based on the user information; and
- notify the one user of the combination candidate selected.

14. The method of claim 12, wherein the regular purchase contract includes a subscription.

15. The device according to claim 1, wherein the candidate selection unit is configured to select the one or more combination candidates when there is a significant change in the user information or when there is a change in the plurality of providable rewards.

16. The method according to claim 12, further comprising:
- selecting the one or more combination candidates when there is a significant change in the user information or when there is a change in the plurality of providable rewards.

17. The medium according to claim 13, wherein instructions, when executed by the processor, further cause the processor to:
- select the one or more combination candidates when there is a significant change in the user information or when there is a change in the plurality of providable rewards.

* * * * *